United States Patent [19]

Krekeler

[11] 3,957,153

[45] May 18, 1976

[54] PUSHER-TYPE CHAIN FOR CONVEYOR MEANS

[75] Inventor: Claude B. Krekeler, Cincinnati, Ohio

[73] Assignee: The Cincinnati Mine Machinery Company, Cincinnati, Ohio

[22] Filed: Feb. 13, 1974

[21] Appl. No.: 442,245

[52] U.S. Cl. .............................. 198/168; 198/170; 198/171; 198/176
[51] Int. Cl.² ......................................... B65G 19/00
[58] Field of Search ........... 198/168, 169, 170, 171, 198/175, 176

[56] References Cited
UNITED STATES PATENTS 2,450,501   10/1948   Clarkson ............................ 198/171

FOREIGN PATENTS OR APPLICATIONS 676,611   6/1939   Germany ........................... 198/170

*Primary Examiner*—John J. Love
*Assistant Examiner*—Douglas D. Watts
*Attorney, Agent, or Firm*—Melville, Strasser, Foster & Hoffman

[57] ABSTRACT

An improved pusher-type chain for a conveyor, the conveyor being of the type comprising an elongated base means having a bottom and upstanding side guides or flanges. The base means may be made up of two or more longitudinal sections joined together in such a way as to permit them to be shifted with respect to each other from side-to-side about the juncture therebetween and to be shifted vertically upwardly and downwardly with respect to each other about the same or other juncture. The pusher-type chain is a continuous chain adapted to be driven in such a way that one of its spans moves longitudinally along the upper surface of the base means bottom and between the upstanding side guides or flanges in a conveying direction whereby to advance the material being conveyed along the upper surface of the base means bottom. The chain itself comprises a plurality of rigid pusher elements of improved construction normally extending substantially transversely of the conveying direction. Adjacent pusher elements are joined together by a series of link elements, including a pair of strap links rendering the chain capable of double articulation (i.e., capable of changing conveying direction both horizontally and vertically) without the use of universal joints or link elements made of flexible material. Furthermore, the strap links enable the ends of each pusher element to shift horizontally to positions wherein the longitudinal axis of the pusher element lies at a far lesser angle to the conveying direction than hitherto possible, thus allowing one end or the other of the pusher element to avoid an obstruction lodged or accumulated at one edge or the other of the base means bottom with a minimum of stress on and a minimum of shortening of the conveyor chain.

41 Claims, 35 Drawing Figures

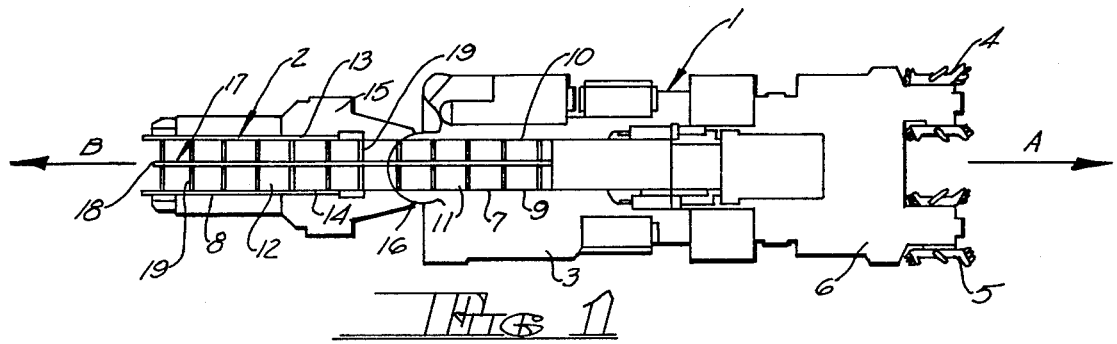
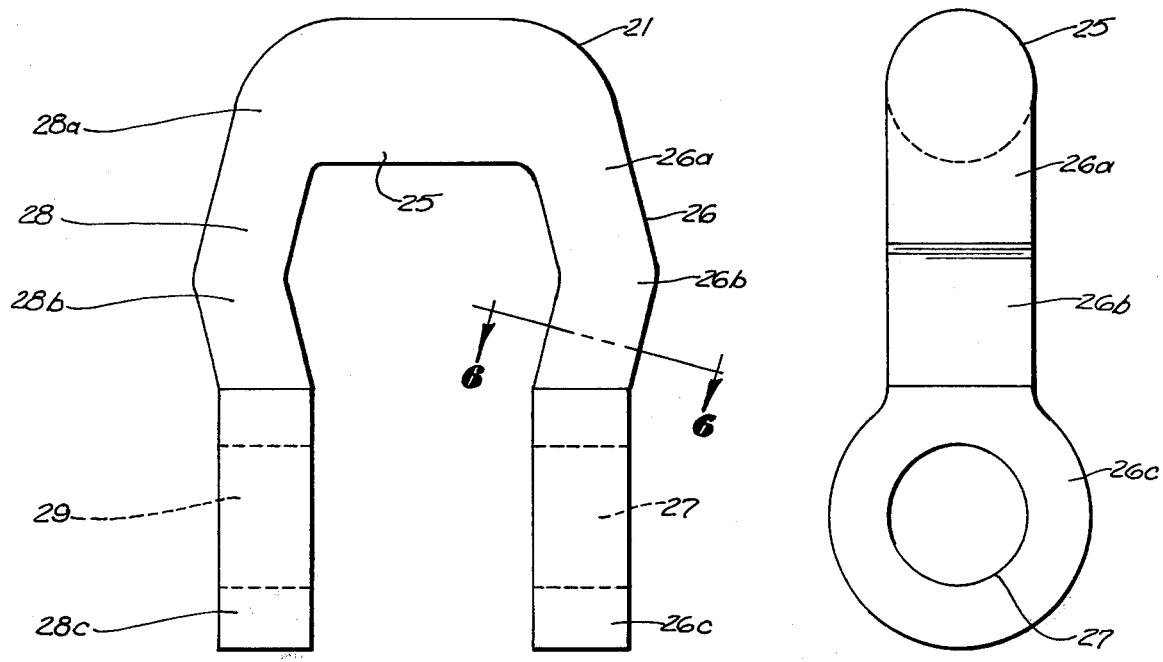
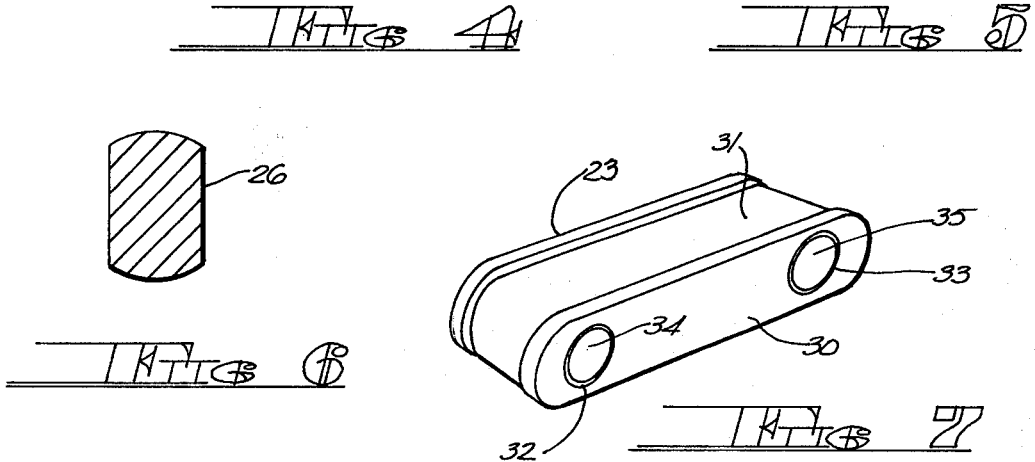

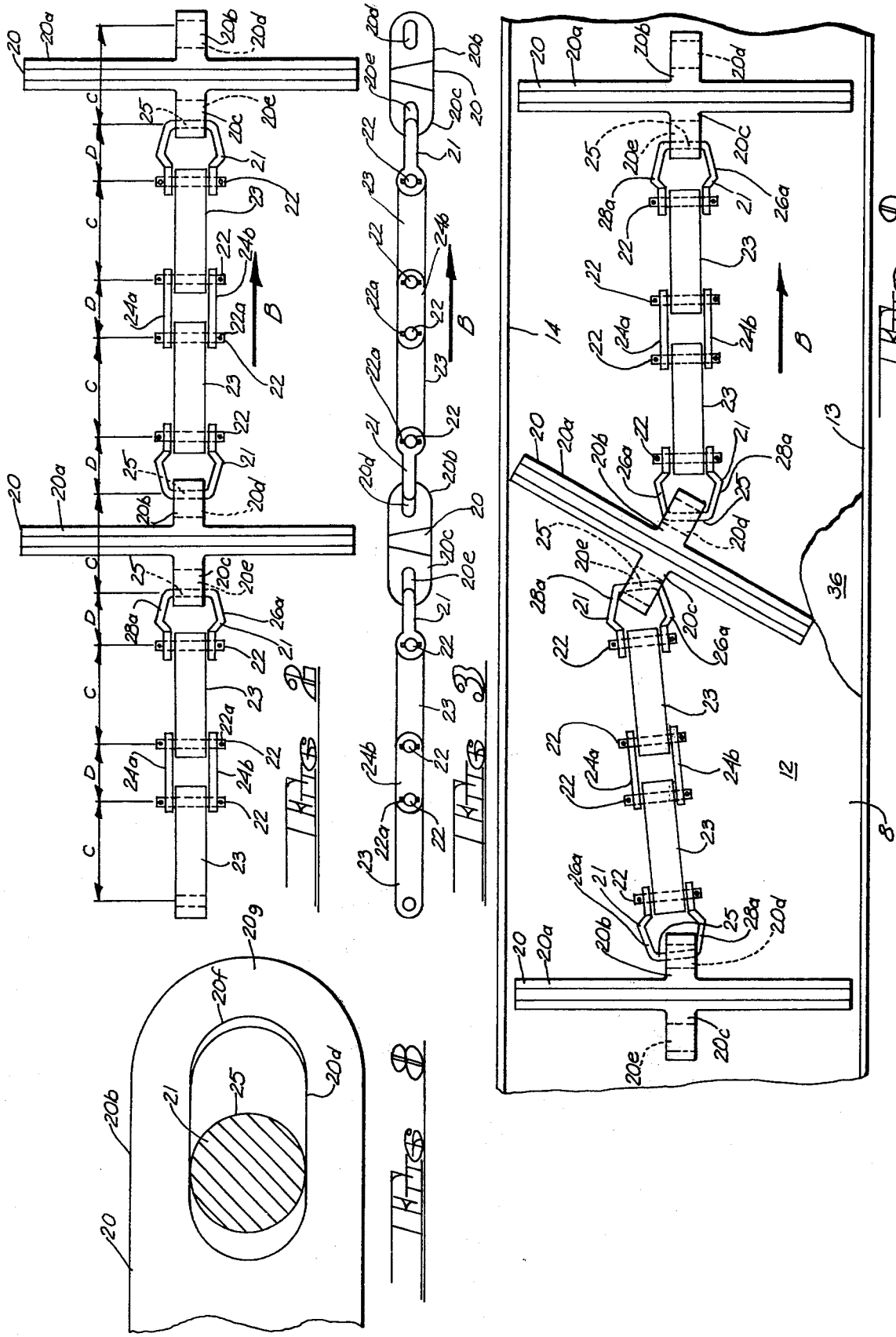

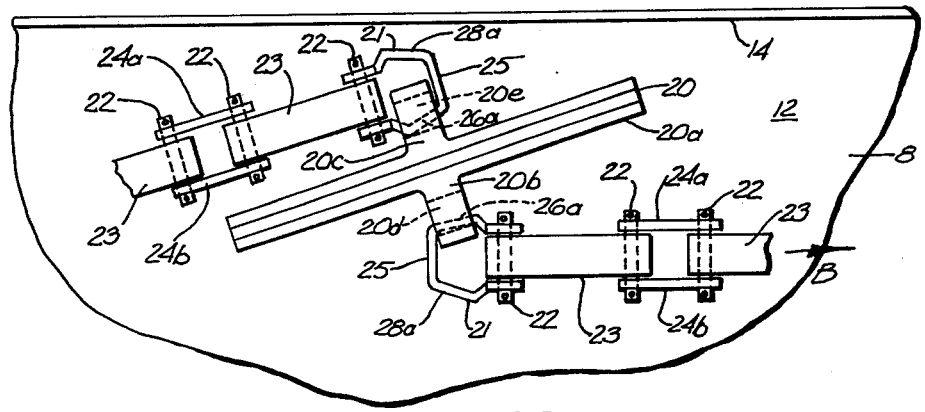
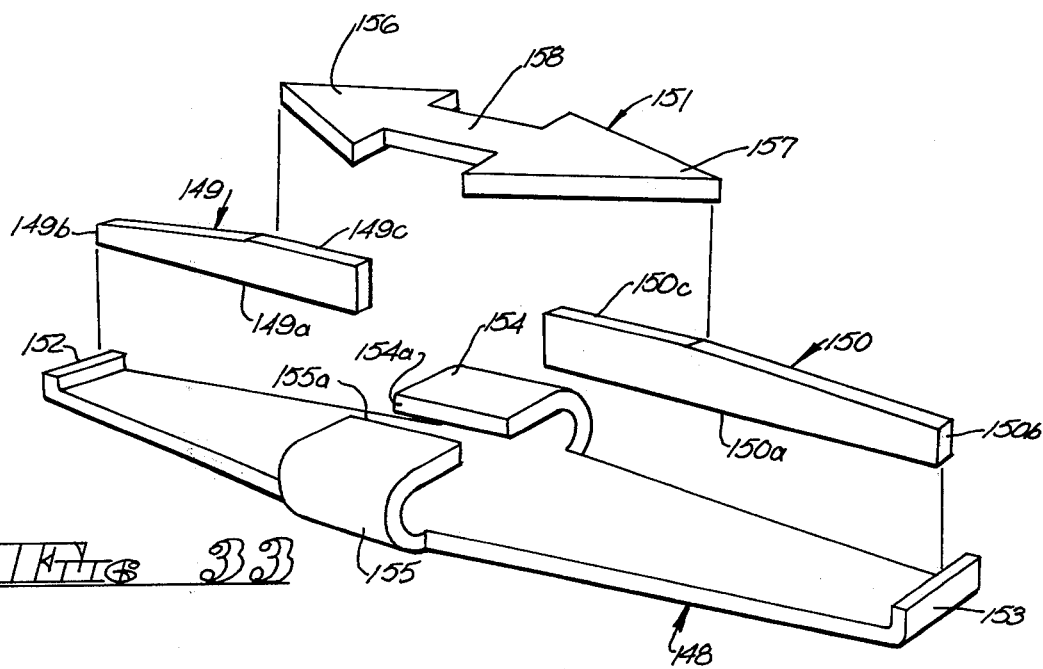
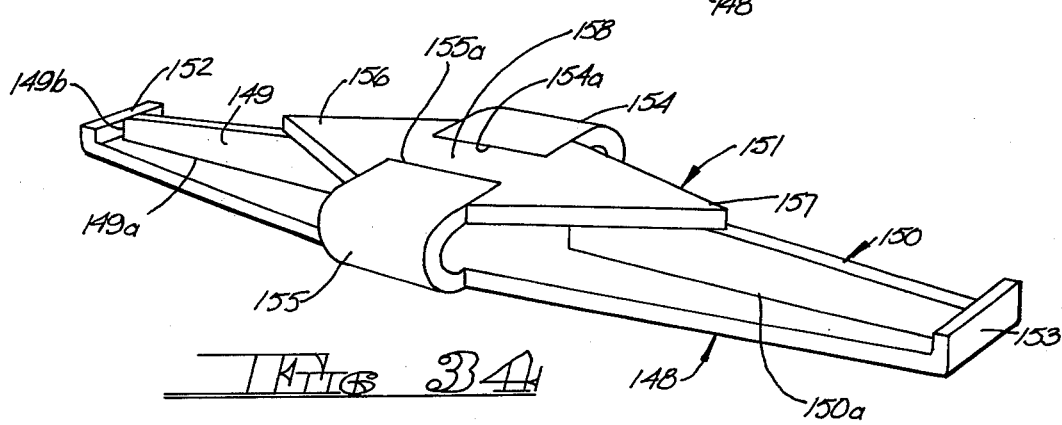

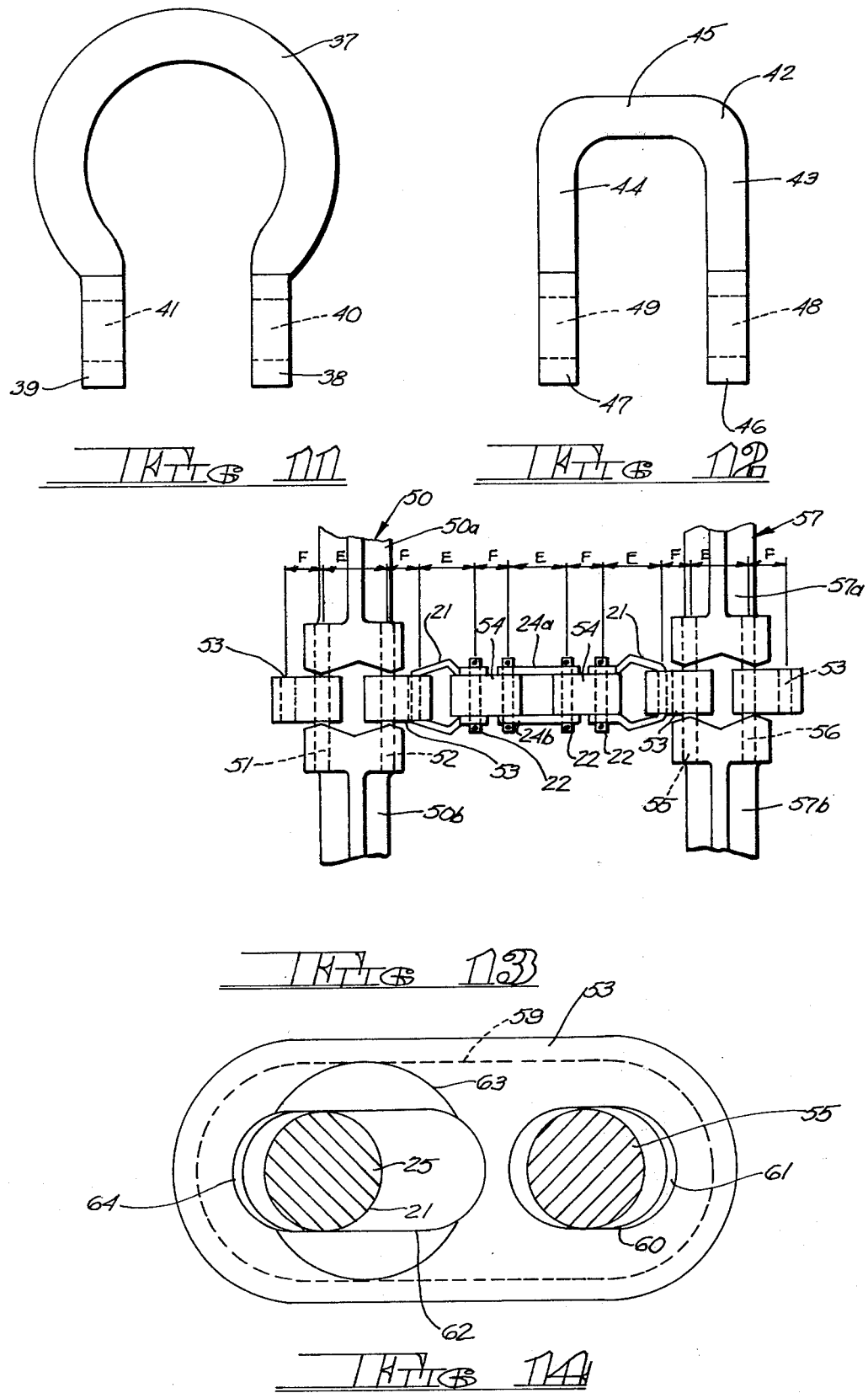

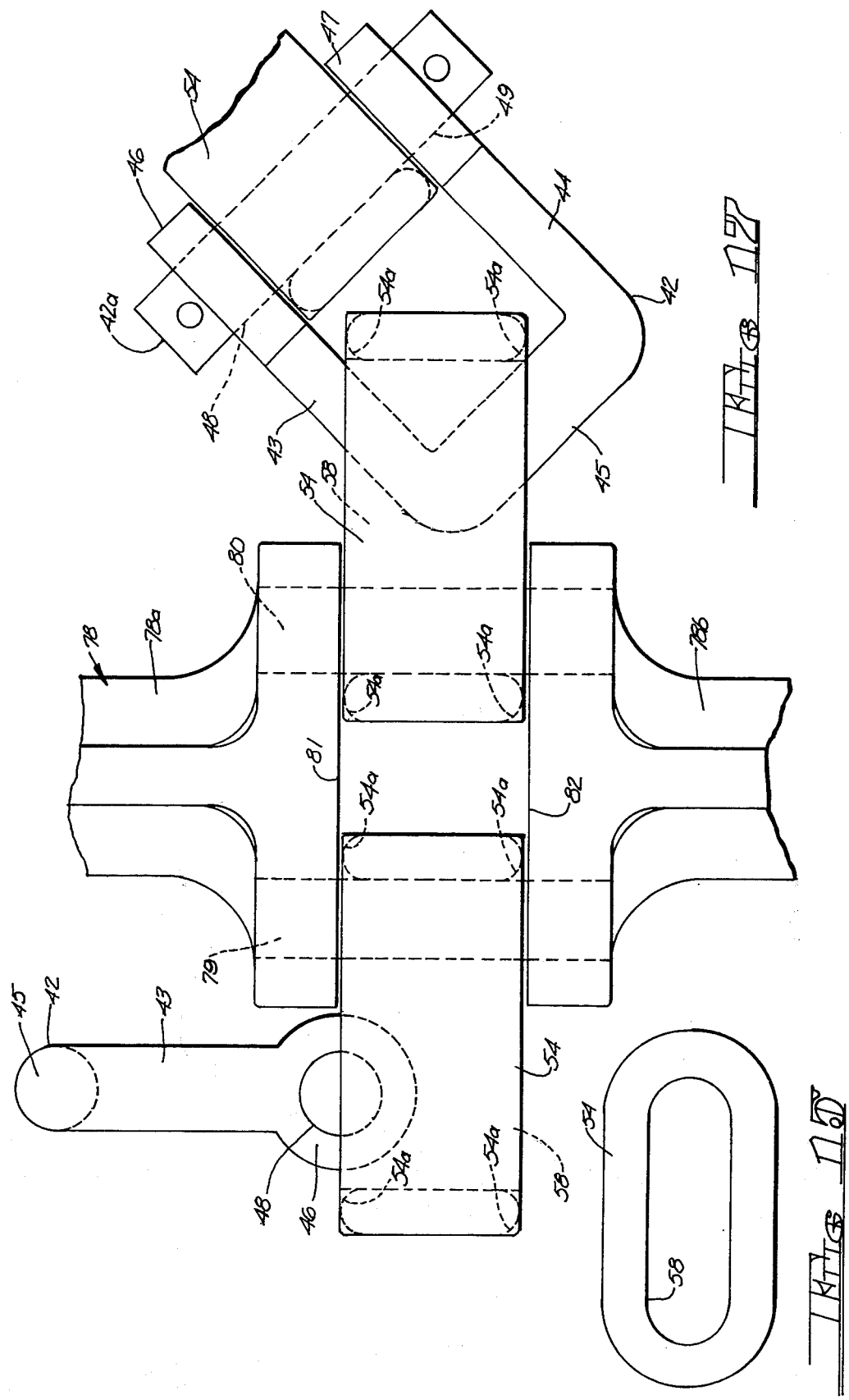

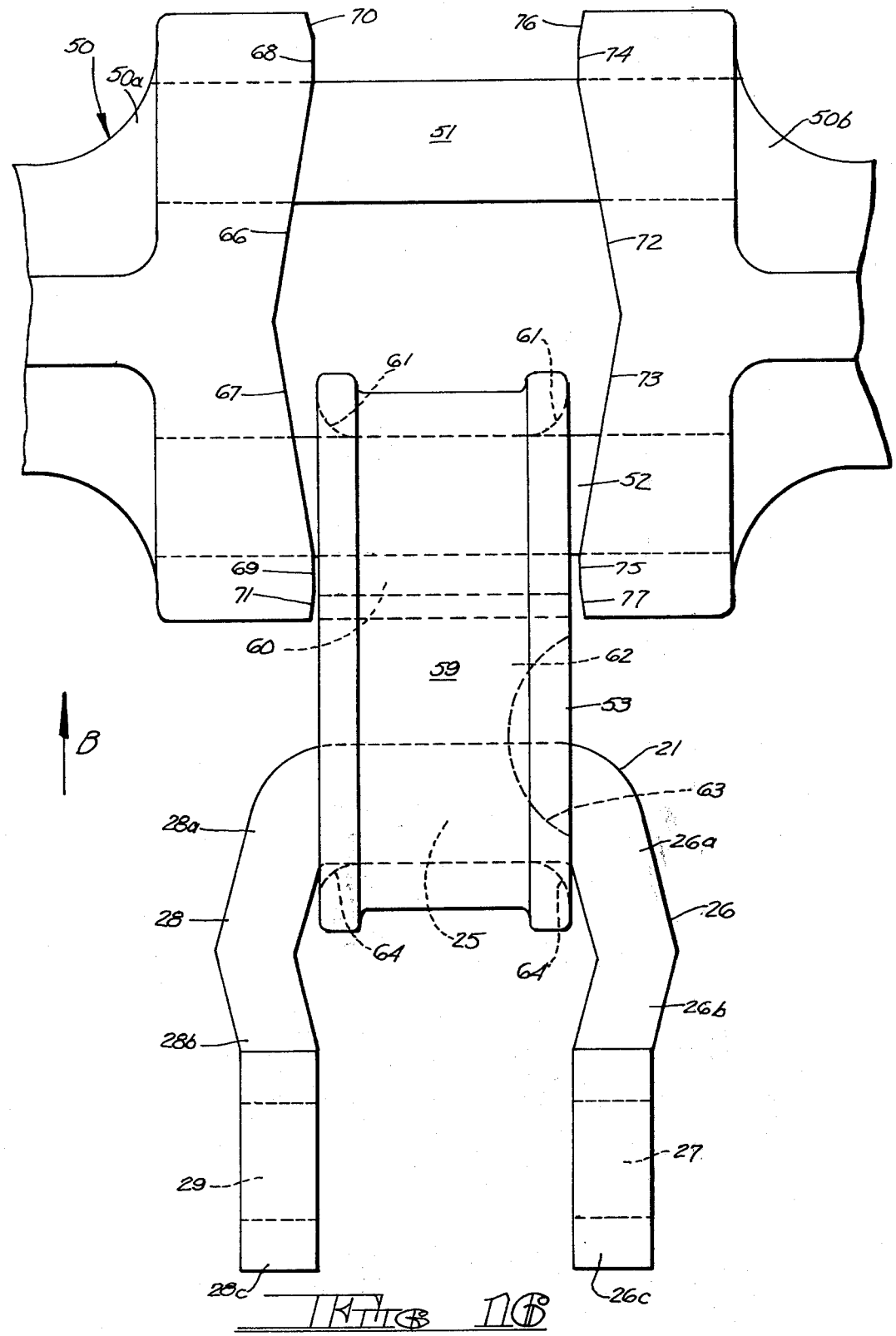

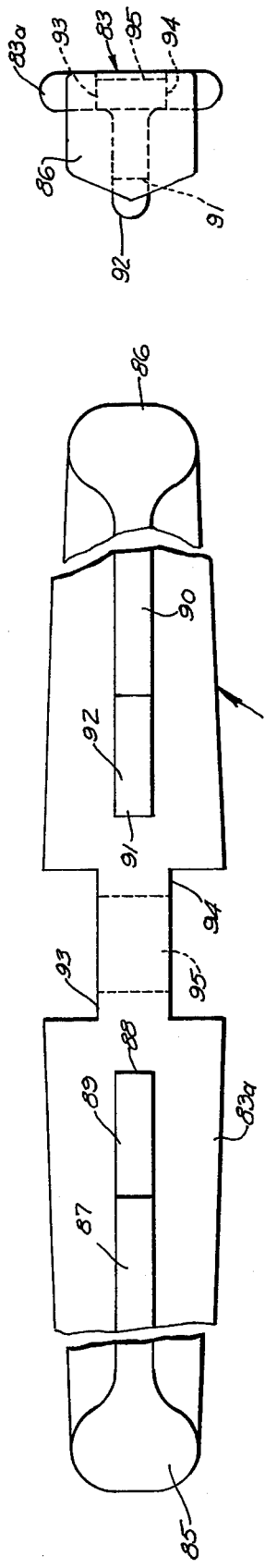
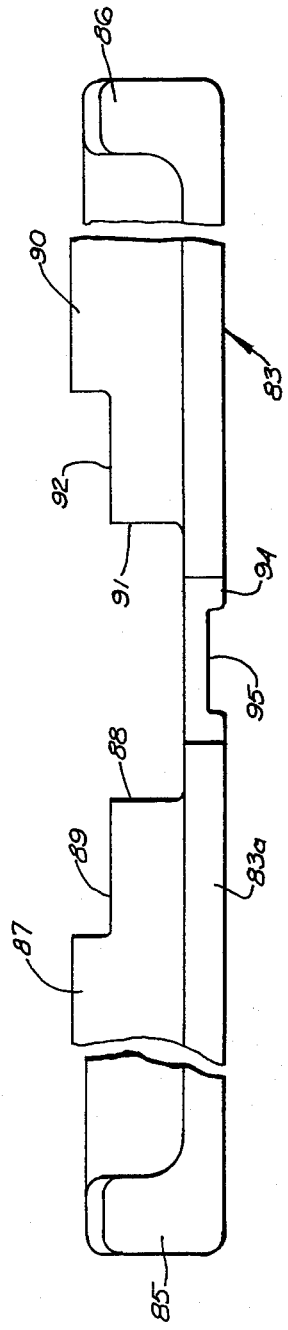
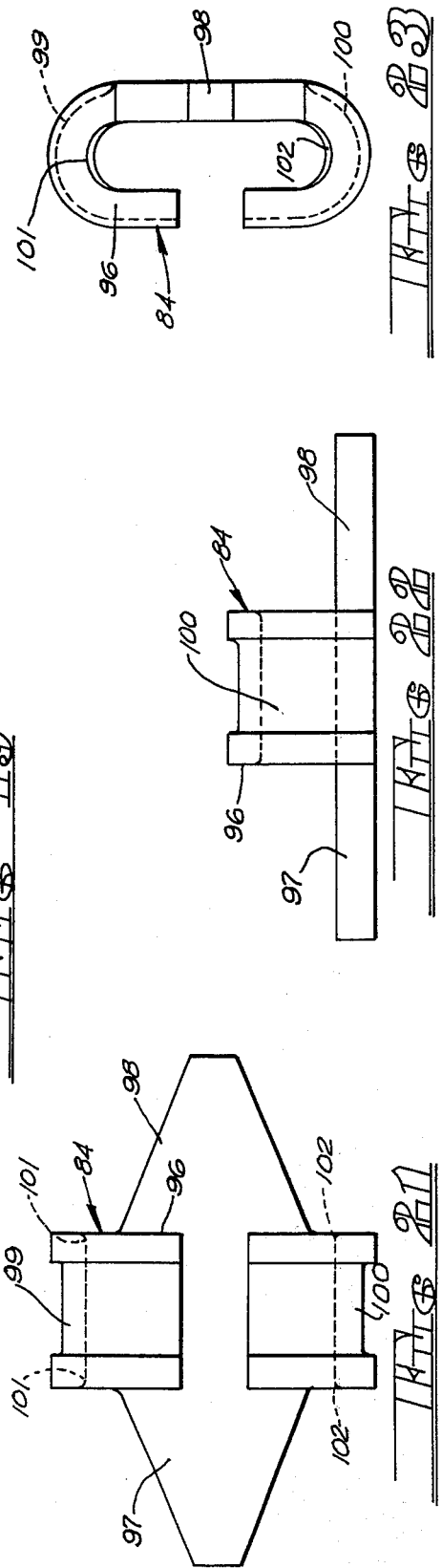

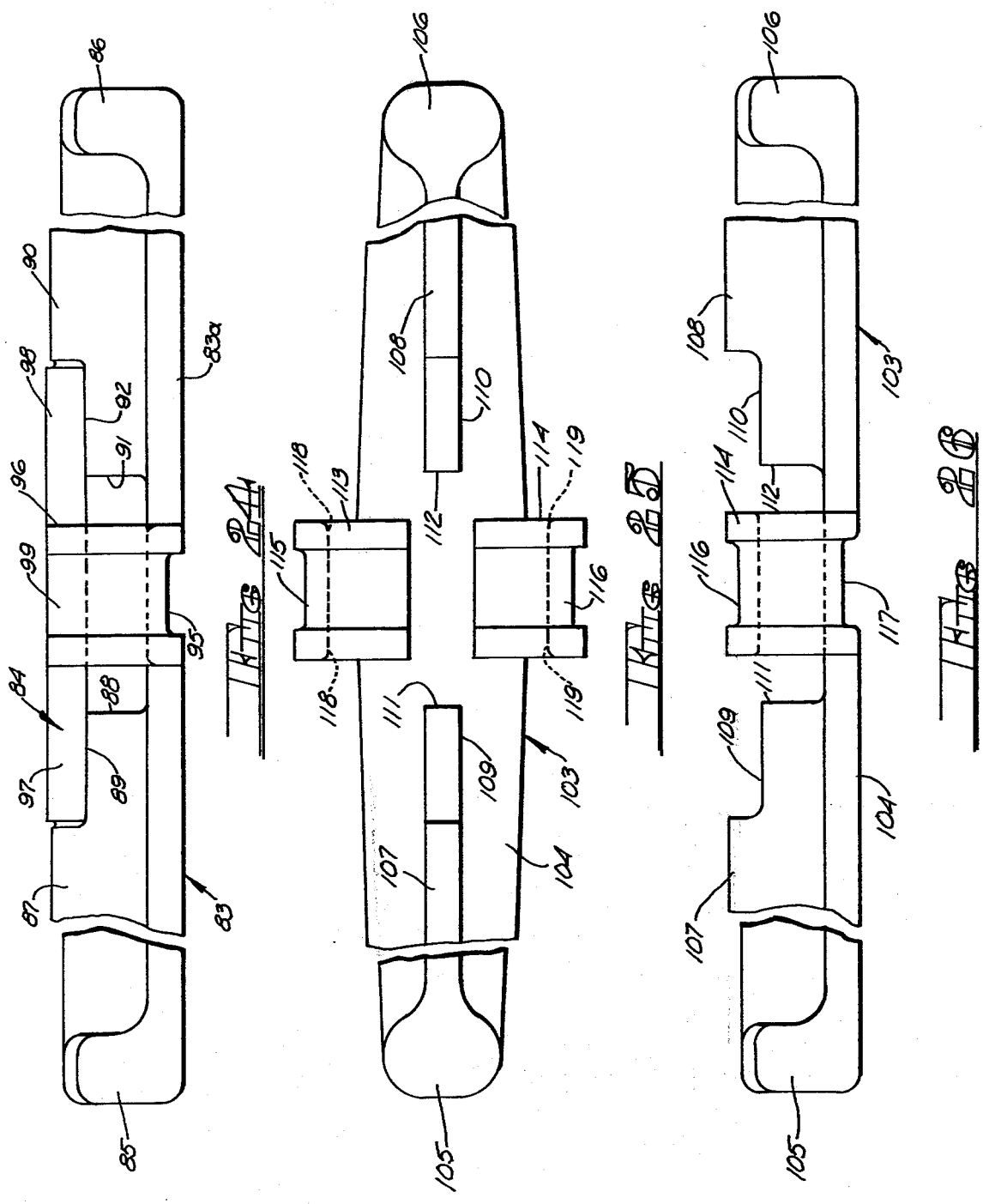

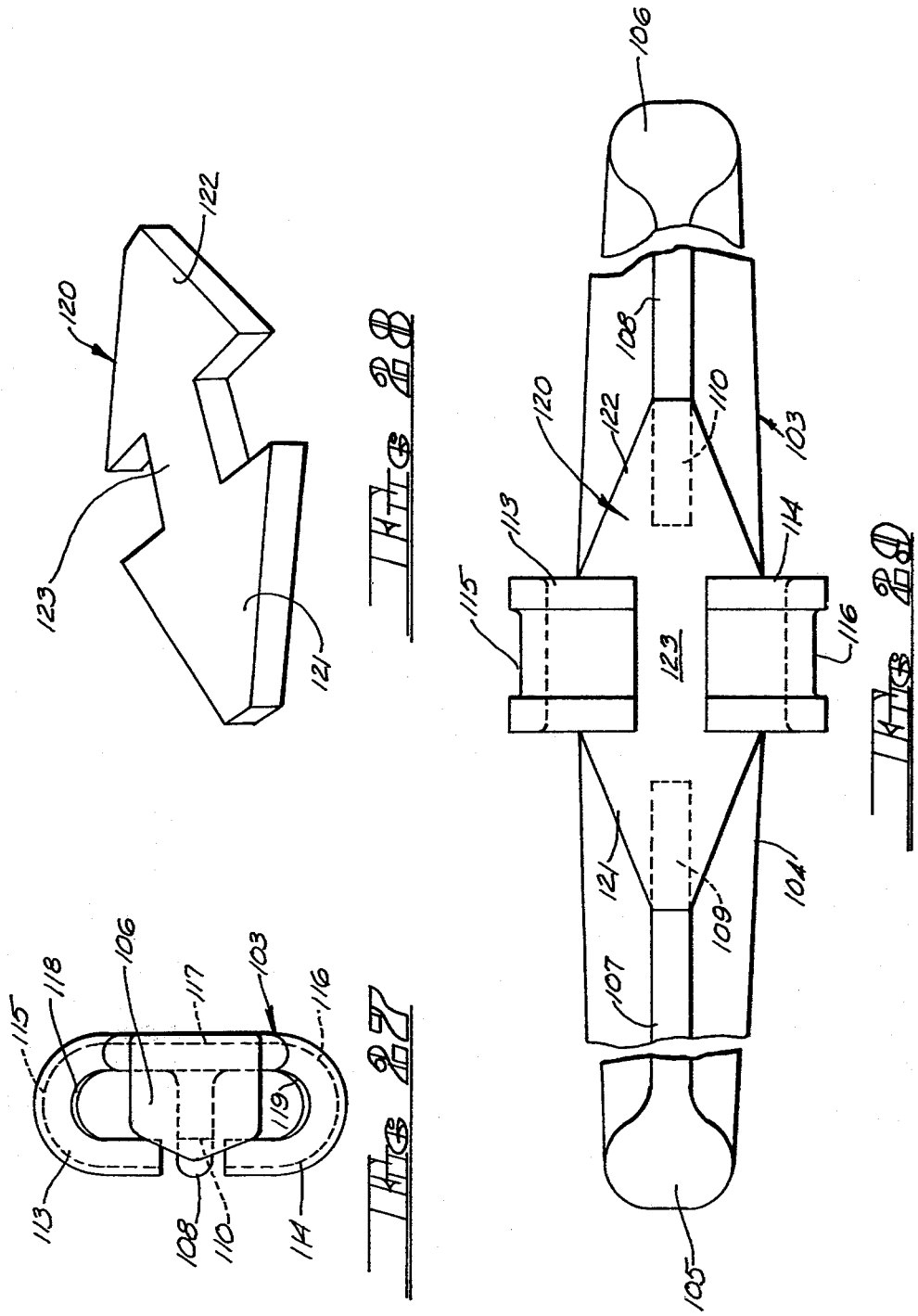

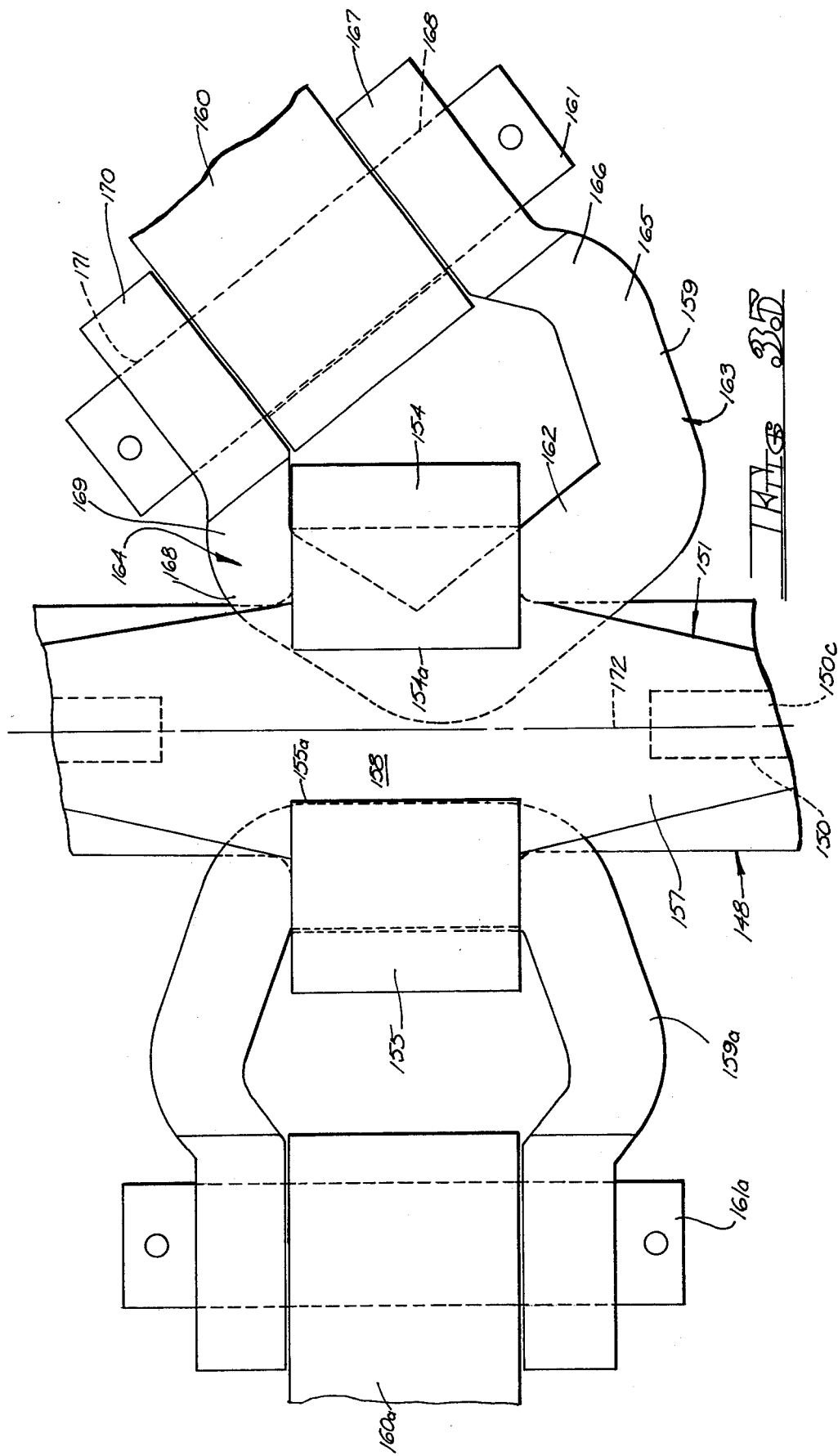

PUSHER-TYPE CHAIN FOR CONVEYOR MEANS

BACKGROUND OF THE INVENTION

1. Field of the Invention

The invention relates to a continuous pusher-type chain for a conveyor having a plurality of rigid pusher elements of novel construction normally extending substantially transversely of the conveying direction and joined together by a series of intervening links. Each series of intervening links includes a pair of strap links rendering the chain capable of double articulation and rendering each pusher element capable of horizontal articulation to a far greater extent than hitherto possible without resort to universal joints or link elements made of flexible material.

2. Description of the Prior Art

The conveyors with which the chain of the present invention is intended to be used have many applications. For purposes of an exemplary showing such conveyors will be described with respect to their use in the mining industry, although their use is not intended to be so limited.

Pusher-type chain conveyors, as used in the mining industry, are found both in the form of separate conveying units and as integral parts of continuous mining machines. A typical continuous mining machine, for example, is self-propelled and is provided at its forward end with cutting means shiftable in such a way that an entry is cut in the material being mined. The entry is so sized as to permit the passage of the mining machine therethrough. Since the cutting operation is a continuous one, means must be provided to move the cut material from in front of the mining machine and to convey it out of the entry. To this end, the mining machine may incorporate several conveyors in its construction, the conveyors acting successively to transport the cut material rearwardly of the machine. Frequently, the mining machine incorporates a "tail conveyor" which is an integral part of the mining machine, located at its rearward end. The purpose of the tail conveyor is to deliver the cut material to other conveying means by which it is removed from the entry. The other conveying means may comprise mine cars, portable belt conveyors, or the like.

The form of tail conveyor most frequently encountered on a continuous mining machine comprises a section of conveyor base means mounted on the mining machine body. One or more additional sections of conveyor base means are connected to and extend beyond the rearward end of the mining machine body. All of the base means sections are characterized by a bottom portion and upstanding side guides or flanges.

In order for the tail conveyor to perform its task properly, the various sections thereof must be capable of both lateral and vertical movement with respect to each other. This enables the cut material to be delivered to a desired point despite changes in orientation of the mining machine as it advances in the entry and changes in level of the entry floor. Similarly, it enables the shifting of the desired delivery point as required.

The tail conveyor incorporates a continuous pusher-type conveyor chain which is driven along the length of the conveyor base sections. The chain is normally provided with rigid pusher elements extending transversely of the conveying direction. The pusher elements are located at spaced intervals along the chain, adjacent pusher elements being joined together by a series of link elements. At one end of the tail conveyor, the continuous chain passes over a driven sprocket means, while at the other end it passes over a driven or idler sprocket or roller.

It will be evident from the above description that the conveyor chain must not only be capable of bending in a vertical plane so as to follow the conveyor base sections and to pass over the sprockets, but also it must be capable of bending in a horizontal plane so as to track along the conveyor base sections when they are angularly related, one to another.

Prior art workers have developed numerous types of conveyor chains to meet these requirements. In general, such chains have comprised a plurality of links and interconnecting plates held together by horizontally disposed pintles. The laterally extending pusher elements have been affixed to or formed as a part of selected ones of the chain plates. A number of approaches have been taken to render such chains capable of double articulation. For example, chains have been produced, the parts of which are loosely fitting. Such chains, however, have been characterized by a minimum of horizontal articulation and have generally proven unsatisfactory.

In other embodiments, selected ones of the chain blocks or links have been made in two parts, pivoted to each other by vertical pintles. Thus a sort of universal joint is formed enabling the chain to deflect in the horizontal plane. This construction, however, has proven to have numerous drawbacks including the fact that the necessary abbreviated length and diameter of the vertical pintles has resulted in chain breakage.

In United States Letters Pat. No. 3,155,225 a pusher-type chain is described wherein many of these problems have been overcome. The chain of this patent has special connector links provided at the positions of the pusher elements. These special connectors have, at their adjacent ends, uniquely formed transverse pintle-receiving perforations. The pusher elements each comprise a pair of pushers joined together by a pair of pintles. Each of the pintles joining a pair of pusher elements passes through one of the uniquely formed transverse pintle-receiving perforations of the special connectors. The facing surfaces of the pusher elements of each pair are also specially configured so that the chain is capable of double articulation with a minimum of lost motion, a minimum of wear and without loss of strength.

The chains taught in the above mentioned United States Letters Patent have been characterized by superior performance in the field. While ample to enable such chains to track in the conveyor base sections, the amount of horizontal articulation of which the pusher elements are capable is nonetheless limited. It is not unusual during the conveying operation for an obstruction to become lodged or to accumulate at one edge or the other of a conveyor base section. Unless each of the pusher elements can override or dodge around such an obstruction, the obstruction can result in breakage of one or more pusher elements or the chain itself. Furthermore, during the attempt by a pusher element to twist horizontally to pass about such an obstruction, the chain is shortened, causing considerable stress on the chain.

The present invention is directed to a pusher chain which has all the advantages of double articulation without the use of loose chain parts, universal joints or link elements made of flexible material. Furthermore, the pusher elements of the chain of the present invention are capable of far greater horizontal articulation than those of U.S. Pat. No. 3,155,225 thereby enabling them to dodge obstructions at one edge or the other of a conveyor base section with a minimum shortening of the chain and a minimum stress upon the chain. The chain construction is such that the pusher elements tend to be self-righting, i.e., to return to their normal positions transverse the conveying direction. Furthermore, as will be shown hereinafter, the teachings of the present invention are applicable to chains of the type taught in the above mentioned United States Letters Patent.

The chain of the present invention is simple in construction, easy and inexpensive to manufacture and characterized by superior strength. The chain can be designed to have any desired pitch and the degree of horizontal articulation can also be controlled by design, depending upon the use for which the chain is intended. When required, the pusher elements or the various link elements of the chain may be more quickly and easily replaced. Furthermore, the invention contemplates the provision of novel pusher elements which may be more easily and inexpensively manufactured and which lend versatility to the chain design, as will be described hereinafter.

SUMMARY OF THE INVENTION

In its various embodiments, the chain of the present invention comprises a continuous chain made up of rigid pusher elements joined together by a series of link elements. As a result, the chain has its pusher elements located at desired intervals along its length. In one embodiment, the pusher elements are unitary elongated structures adapted to lie transversely of the conveying direction. Centrally of each pusher element there are forward and rearward extensions. Each of these extensions is provided with a transverse perforation of particular configuration (as described hereinafter) and adapted to receive a generally U-shaped, strap-like link.

In this exemplary embodiment, the strap link engaging the rearward extension of one of the pusher elements has its free ends connected by pintle means to a substantially conventional link. At its other end, the conventional link is joined to the ends of a pair of plate-like links by pintle means. The other ends of the plate-like links are, by pintle means, pivoted to one end of another conventional link. The free end of this link, in turn, is pivotally connected by pintle means to the free ends of another strap link engaged in the transverse perforation of the forward extension of the next pusher element.

It will be understood by one skilled in the art that the number of conventional links and conventional plate-like links may be varied, depending upon the desired distance between adjacent pusher elements.

The strap links may themselves have various configurations (as will be described hereinafter) so long as they are of sufficient width and appropriate configuration to enable their insertion in the transverse perforation of the forward and rearward extensions of the pusher elements and to permit proper horizontal articulation of the pusher elements. The configuration of the strap links may be further varied in those embodiments of the chain wherein the strap links are engaged in the forward and rearward pusher element extensions during assembly of the pusher elements.

The pusher elements, themselves, may be of simplified construction and various embodiments will be described hereinafter. Finally, the U-shaped strap links of the present invention may be used with pusher elements of the type taught in United States Letters Pat. No. 3,155,225 provided the connectors through which the pintles holding the pusher elements together pass have appropriately configured transverse holes to receive the strap links.

BRIEF DESCRIPTION OF THE DRAWINGS

FIG. 1 is a semi-diagrammatic plan view of a typical continuous mining machine having a tail conveyor incorporating a pusher-type conveyor chain.

FIG. 2 is a plan view of one embodiment of the present invention and illustrates a pair of pusher elements and the intermediate link elements including the strap links.

FIG. 3 is a side elevational view of the structure of FIG. 2.

FIG. 4 is a top plan view of a strap link of the present invention.

FIG. 5 is a side elevational view of the strap link of FIG. 4.

FIG. 6 is a cross sectional view taken along the section line 6—6 of FIG. 4.

FIG. 7 is a perspective view of a conventional link as used in the embodiment of FIGS. 2 and 3.

FIG. 8 is a fragmentary side elevational view, partly in cross section, of the forward extension of a pusher element illustrating the transverse perforation therethrough with a strap lug mounted therein.

FIG. 9 is a fragmentary plan view of the embodiments of FIGS. 2 and 3 as mounted on a conveyor base section and illustrates the manner in which a pusher element may flex in the horizontal direction to avoid an obstruction in the conveyor.

FIG. 10 is a fragmentary plan view similar to FIG. 9 and illustrating further horizontal articulation of the pusher element.

FIGS. 11 and 12 are top plan views of additional embodiments of the strap link of the present invention.

FIG. 13 is a fragmentary top plan view of another embodiment of the present invention utilizing pusher elements of the type taught in United States Letters Patent 3,155,225.

FIG. 14 is a side elevational view, party in cross section, of a connector of the type used in the embodiment of FIG. 13.

FIG. 15 is a side elevational view of a chain link used in the embodiment of FIG. 14.

FIG. 16 is a fragmentary top plan view of the embodiment of FIG. 14 illustrating in detail the assembly of a pusher element, a connector link and a strap link.

FIg. 17 is a fragmentary top plan view similar to FIG. 16 and illustrating a modified pusher element and the strap link of FIG. 12.

FIGS. 18, 19 and 20 are respectively and fragmentary top plan view, a fragmentary side elevational view and an end elevational view of a first part of one embodiment of a pusher element of the present invention.

FIGS. 21, 22 and 23 are respectively a top plan view, a side elevational view and an end elevational view of a second part of the same pusher element.

FIG. 24 is a fragmentary side elevational view showing the assembly of the first part illustrated in FIGS. 18 through 20 and the second part illustrated in FIGS. 21 through 23.

FIGS. 25, 26 and 27 are respectively a fragmentary top plan view, a fragmentary side elevational view and an end elevational view of a first part of another embodiment of a pusher element of the present invention.

FIG. 28 is a perspective view of a second part of the same pusher element.

FIG. 29 is a fragmentary top plan view illustrating the assembly of the first part shown in FIGS. 25 through 27 and the second part illustrated in FIG. 28.

FIG. 33 is an exploded perspective view of yet another embodiment of the pusher element of the present invention.

FIG. 34 is a perspective view of the fully assembled pusher element embodiment of FIG. 33.

FIG. 35 is a fragmentary top plan view of a chain comprising the pusher element of FIGS. 33 and 34 and a strap link similar to that of FIG. 4.

DESCRIPTION OF THE PREFERRED EMBODIMENTS

Figure 30:
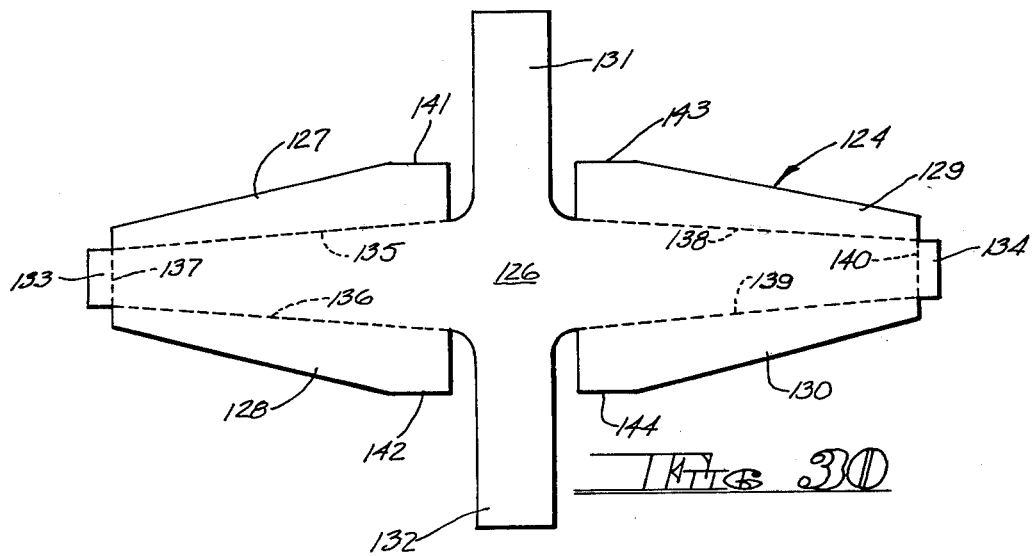
FIG. 30 is a plan view of a first part of another embodiment of a pusher element.

For a better understanding of the invention reference is first made to FIG. 1 illustrating an exemplary environment for the pusher-type chains of the present invention. FIG. 1 diagrammatically illustrates a typical continuous mining machine generally indicated at 1 and provided with a tail conveyor generally indicated at 2. Briefly, the mining machine has a body portion 3 which is usually mounted on wheels or treads and is self-propelled. At the forward end of the mining machine cutting means are provided as shown at 4 and 5. These cutting means may take various well known forms and are mounted on means such as the frame 6 enabling the cutting means to be shifted in such a way that they will cut an entry large enough to receive and to permit advancement of the mining machine in the cutting direction, indicated by arrow A.

By various well known conveying means the cut material at the forward end of the mining machine is transported over or through the mining machine to the tail conveyor 2. The tail conveyor comprises a conveyor base means, illustrated in FIG. 1 as made up of two sections 7 and 8. As indicated above, additional conveyor sections may be present. The base means section 7 has a bottom portion 9 and upstanding side guides or flanges 10 and 11. Similarly, the section 8 has a bottom portion 12 and upstanding side guides or flanges 13 and 14. The section 8 is mounted on a boom 15 articulated to the rearward end of the mining machine body 1 as at 16. The articulation is such that the boom 15 and its conveyor base means section 8 are shiftable with respect to the conveyor base means section 7 both in the vertical plane and the horizontal plane for reasons explained above.

A pusher-type conveyor chain, generally indicated at 17, extends along the length of the conveyor base means sections 7 and 8 and is adapted to be driven along the upper surface of their bottom portions 9 and 12. It will be understoood that the chain 17 is a continuous chain. Normally it will be driven by a sprocket (not shown) at at least one end of the tail conveyor 2. The chain comprises an elongated chain portion 18 having affixed thereto a plurality of rigid pusher elements 19 extending substantially transversely of the conveying direction indicated by arrow B. It will be seen that the pusher elements extend to both sides of the chain 18 and that the pusher elements are located at intervals along the length of the chain.

A first embodiment of the chain of the present invention is illustrated in FIGS. 2 through 10 wherein like parts have been given like index numerals. Turning first to FIGS. 2 and 3, the chain is illustrated as having pusher elements, two of which are shown at 20. The precise construction and configuration of the pusher elements does not constitute a limitation on the present invention. Additional exemplary embodiments of pusher elements will be described hereinafter. In FIGS. 2 and 3, the pusher elements are illustrated as integral, one-piece structures, each comprising an elongated body 20a. For purposes of description, the conveying direction is again indicated by arrows B in FIGS. 2 and 3. The elongated body 20a of each pusher has centrally thereof a forward lug 20b and a rearward lug 20c, identical and diametrically opposed to each other. The forward extension 20b has a transverse perforation 20d therethrough. As is clearly shown in these figures, the perforation 20d is of elongated cross section. The rearward extension 20c has a similar transverse perforation 20e. More will be said about the perforations 20d and 20e hereinafter.

Adjacent pusher elements 20 are joined together by a series of link elements. The perforations 20d and 20e in the forward and rearward pusher element extensions 20b and 20c are so sized as to freely receive the base portions of generally U-shaped strap links 21. The free ends of each strap link 21 are pivotally connected by a pintle 22 to one end of a conventional chain link 23, the pintle 22 passing through coaxial holes in the free ends of the strap link 21 and the adjacent end of the conventional link 23. The free ends of adjacent conventional links 23 are joined together by conventional plate links 24a and 24b again by means of pintles 22 passing through coaxial holes in the ends of the conventional links 23 and conventional plate links 24a and 24b. Any appropriate means may be provided to prevent axial shifting of the pintles 22. For purposes of an exemplary showing only, the pintles in FIGS. 2 and 3 are illustrated as having transverse perforations at their ends for the receipt of roll pins or the like, shown at 22a.

The strap link 21, used in the embodiment of FIGS. 2 and 3, is most clearly shown in FIGS. 4 through 6. The strap link 21 has a generally U-shaped configuration. The base portion 25 of the strap link is of circular cross section. The leg 26 of the strap link has slightly flattened sides, as shown in FIG. 6. The leg has a first portion 26a which flares slightly outwardly and a second portion 26b which flares slightly inwardly. While not necessarily so limited, in the embodiment shown in FIG. 4, both leg portions 26a and 26b lie at an angle of about 15° to a plane perpendicular to the axis of the base portion 25.

Finally, the leg 26 terminates in an enlarged circular portion 26c having a pintle-receiving perforation 27 passing therethrough.

The leg 28 of the strap link 21 is a mirror image of the leg 26, having a first portion 28a equivalent to leg portion 26a, a second portion 28b equivalent to leg portion 26b and a circular portion 28c equivalent to portion 26c of leg 26. The leg portion 28c has a pintle receiving perforation 29 extending therethrough and being coaxial with the perforation 27.

The conventional link 23 again may take any appropriate configuration. An exemplary link is illustrated in FIG. 7 as comprising an elongated body 30 rounded at its ends. The central portion of the body, about its periphery, may be slightly depressed, as at 31. Such a depression will assist in maintaining proper positioning of the link 23 as it passes about the conveyor sprocket means (not shown). The body 30 has, near its ends, pintle-receiving transverse perforations 32 and 33. Where desired, the perforations 32 and 33 may be provided with sleeves 34 and 35, respectively. The sleeves may be permanently affixed in or replaceably located in their respective perforations. The sleeves 34 are intended to prevent wear of the perforations 32 and 33 by the pintle means located therein, during use of the chain. The sleeves 34 and 35 may be made of hard material, as is known in the art.

The plate links 24a and 24b (see FIGS. 2 and 3) simply constitute elongated members thinner than the conventional links 23. The plate links may be rounded at their ends and and have pintle-receiving perforations near their ends. Again, such pintle-receiving perforations may be provided with wear sleeves (not shown), as desired.

FIG. 8 is a fragmentary side elevational view, partly in cross section, illustrating an extension 20b of a pusher element 20 together with its perforation 20d with the base 25 of a strap link 21 located therein. It will be noted that the perforation 20d is of a height (as viewed in FIG. 8) such that it will just nicely receive the base 25 of the strap link 21. The height of the cross section of leg 26 (as viewed in FIG. 6) is again the same as the diameter of the base portion 25 of the strap link. The width of the perforation 20 (as viewed in FIG. 8) is greater than the outside diameter of the circular portions 26c and 28c of the strap link 21. Thus, in assembly, the strap link may be turned on its side and one of its circular portions 26c and 28c inserted through the perforation 20d. This is made possible by virtue of the fact that the ring-like portions 26c and 28c are of lesser width than the diameter of the base portion 25 of the strap link. Similarly, the width dimension of leg 26, as viewed in FIG. 6, is less than the diameter of the base 25. The same is, of course, true of leg 28. Once the circular portion of the strap link leg has passed through the perforation 20d, the strap link may be rotated to its final position as shown in FIG. 2. It will be noted from FIGS. 2 and 4 that the base portion 25 of the strap link is of a length substantially equal to the width of the extension 20b of the pusher element.

The forward end of perforation 20d may have its corners relieved. One such relief is shown at 20f in FIG. 8. These reliefs will assist in the interaction of the perforation 20d and its strap link (to be described hereinafter). They will also alleviate undesirable pressures at these corners.

It will be understood that the perforation 20e of pusher element extension 20c will be substantially identical to the perforation 20d of extension 20b just described. Insertion of a strap lug in the perforation 20e is accomplished in the same manner. It will also be understood by one skilled in the art that the distance between adjacent pusher elements 20 may be varied. For example, referring again to FIGS. 2 and 3, the plate links 24a and 24b and one of the conventional links 23 could be eliminated to bring the pusher elements closer together. By the same token, additional sets of conventional links and plate links could be used to enlarge the space between adjacent pusher elements. From FIGS. 2 and 3, it will be evident that by virtue of the horizontally oriented pintles 22 and horizontally oriented base portions 25 of strap lugs 21 the chain is capable of complete flexing in a vertical plane, i.e., upwardly and downwardly.

To show the improved articulation in a horizontal plane, reference is made to FIG. 9. In FIG. 9, like parts of the chain have been given like index numerals. Again the conveying direction has been indicated by arrow B.

In FIG. 9 the chain is shown mounted on a conveyor section. For purposes of an exemplary showing, the conveyor section may be considered to be the conveyor section 8 of FIG. 1. Thus, the conveyor section has a bottom portion 12 and upstanding side guides or flanges 13 and 14. Finally, the conveyor section 8 is shown as having a deposited or accumulated obstruction 36 on the upper surface of the bottom portion 12 adjacent the side guide or flange 13. The centermost pusher element of FIG. 8 is illustrated in the position it can assume to avoid the obstruction 36.

It will be noted from FIG. 8 that the centermost pusher element 20 is assuming a flexed position in the horizontal plane wherein its long axis lies at a lesser angle to the conveying direction than hitherto possible. This is achieved by virtue of the elongated cross sectional configuration of perforation 20d in pusher element extension 20b and peforation 20e in pusher element extension 20c as well as the particular configurations of the strap links 21 passing through these perforations.

Thus, the leg portion 26a of strap link 21 may partially enter the perforation 20e, while the opposite end of base portion 25 of the strap link may extend beyond the perforation 20e. In similar fashion, the leg portion 26a of strap link 21 extending through perforation 20d may partially enter that perforation. while the opposite end of the base portion 25 of the same strap link will extend beyond the perforation 20d. This arrangement provides for far greater flexing in the horizontal plane than could hitherto be achieved by pusher-type conveyor chains without the use of universal joints, link elements made of flexible material or the like.

It will be understood by one skilled in the art that had the obstruction 36 been adjacent side guide 14 instead of side guide 13, a similar but opposite position could be achieved by the centermost pusher element 20 of FIG. 9. In such an instance, leg portions 28a of the strap links passing through perforations 20d and 20e would partially enter those perforations while the opposite ends of the base portions 25 of those strap links would extend beyond these perforations. It will further be evident from FIG. 9 that while considerable flexing can be achieved by the pusher elements 20, such flexing does not cause a severe shortening of the pusher chain, again by virtue of the configuration of and interaction of perforations 20d and 20e and their respective strap links. All of the pusher elements can shift horizontally in the manner described with respect to the centermost one of FIG. 9.

Returning to FIG. 2 and assuming the chain to be in its normal taut position as illustrated, the pitch of the pusher element 20 may be considered to be the center lines of the base portions 25 of strap links 21 passing through perforations 20d and 20e. The pitch is indicated in FIG. 2 by the distance "C". It will be understood that all of the pusher elements 20 will have the same pitch. Similarly, connecting links 23 will have the same pitch, constituting the distance between the center lines of the pintles 22 passing through the connecting links and indicated by the distance "C".

Each of the strap links will have the same pitch. The strap link pitch constitutes the distance between the center line of the base portion 25 of the strap link and the center line of the pintle 22 attaching the strap link to the adjacent connecting link. This distance is indicated in FIG. 2 by "D". The pitch of the plate links 24a and 24b constitutes the distance between the center lines of pintles 22 joining them to adjoining ones of the connecting links. The pitch of the plate links will be the same as the pitch of the strap links and is therefore represented by the distance "D" in FIG. 2. Conventionally, the pitch of the chain constitutes the distance "C" plus the distance "D".

When the chain of the present invention is to be designed for an existing mining machine, it will be understood that the mining machine itself will determine the pitch the chain must have. As the chain passes over the mining machine sprockets, the pusher elements 20 and connecting links 23 will lie between sprocket teeth. The sprocket teeth, themselves, will extend upwardly through each space between connecting links 23 at the plate links 24a and 24b and each space between adjacent ones of the connecting links 23 and the pusher element extensions 20b and 20c at the strap links 21. Many existing mining machines today, for example, require a chain having a pitch of 5-¼ inches.

Working within the parameters of a predetermined pitch requirement, chains of the present invention may be so designed as to be capable of a desired maximum horizontal articulation within a wide range thereof. In the designing process, a number of factors must be taken into account. These factors include the required strength of the chain for the use for which it is intended, the thickness of the portion 20g of the pusher extensions (see FIG. 8), the diameter of the strap link base 25, the pitch of the pusher elements 20 and the width of the extensions 20b and 20c on the pusher elements 20.

The chain illustrated in FIGS. 2, 3 and 9 is so designed that the pusher elements are capable of horizontal articulation to the extent that the longitudinal axis of the pusher element may be substantially parallel to the longitudinal axis of one or both of the adjacent connecting links 23. FIG. 10 illustrates the chain of FIG. 9 and like parts have been given like index numerals. It will be noted from FIG. 10 that the longitudinal axis of pusher element 20 is substantially parallel to the longitudinal axis of that adjacent connecting link 23 nearest the side flange 14 of the conveyor. As indicated above, the pusher element 20 could achieve a position wherein its long axis is substantially parallel to both of the adjacent connecting links. Under these circumstances, the long axis of the pusher element 20 would lie at a very low angle to the conveying direction B.

The degree of articulation just described constitutes an extreme and would, within predetermined pitch requirements, require tradeoffs between the various factors listed above. In most applications, such extreme articulation is not required.

Embodiments of the chain of the present invention have been made capable of horizontal articulation to the extent that the long axis of the pusher element lies at an angle to the conveying direction of about 44°. For most applications, this amount of articulation will be sufficient. Chains of this type require a minimum of tradeoffs with respect to the factors listed above and can be made with strength characteristics greater than achievable by prior art structures having universal joints or flexible elements. When compared to chains of the type taught in the above mentioned United States Pat. No. 3,155,225 which are capable of horizontal articulation to the extent that the long axis of the pusher elements lie at an angle of about 80° to the conveying direction, it will be understood that the degree of articulation of the chain of the present invention has been markedly improved.

Reference is again made to FIGS. 4 and 5. Another factor which must be kept in mind in the design of chains of the type shown in FIGS. 2, 3, 9 and 10 is that the effective length of leg portions 26a and 26b or 28a and 28b of strap link 21 (i.e., the distance between the inside surface of base portion 25 and enlarged portion 26c or enlarged portion 28c) must be equal to or greater than the width of the pusher element extension engaged by the strap link to enable the strap link to be passed through the pusher element extension perforation during assembly of the chain. When, in the design of a chain, this requirement cannot be met, there are ways in which it may be avoided, as will be described hereinafter.

The strap link 21 of FIG. 4 may be made in other configurations. FIGS. 11 and 12 illustrate additional exemplary embodiments of the strap link. In FIG. 11 a strap link 37 is shown wherein the legs and base portion constitute a continuous arcuate structure. This structure terminates in substantially circular ends 38 and 39, similar to the ends 26c and 28c of FIG. 4. The ends 38 and 39 are provided with pintle receiving perforations 40 and 41 respectively. In FIG. 12, a strap link 42 is illustrated having substantially straight leg portions 43 and 44, extending perpendicularly from the base portion 45. Again, legs 43 and 44 terminate in circular ends 46 and 47 provided with pintle-receiving perforations 48 and 49, respectively.

The strap link may take on other configurations (not shown). The importannt consideration is that the base and leg portions be so sized, shaped and spaced that they permit the desired articulation of their respective pusher element and permit insertion of the strap link through the transverse perforation in the link or pusher element it engages when necessary.

FIGS. 13 through 16 illustrate the present invention as applied to pusher assemblies of the type taught in United States Letters Pat. No. 3,155,225. Again, like parts have been given like index numerals.

Turning first to FIG. 13, a first pusher assembly is generally indicated at 50. The pusher assembly 50 is made up of a pair of identical pushers 50a and 50b joined together by elongated pintles 51 and 52. The pintles 51 and 52 may be welded or otherwise affixed to the pushers 50a and 50b and they maintain these pushers in parallel spaced relationship.

Mounted on pintles 51 and 52 are identical connector links 53. The pintles 51 and 52 pass through transverse perforations in the connectors 53. Each connector has a second perforation adapted to receive the base portion of a strap link 21 which may be identical to that of FIGS. 4 through 6 (as shown) or to any of those strap links 37 and 42 shown in FIGS. 11 and 12.

The strap link 21 is, in turn, connected by pintle 22 to a link 54. While link 54 may be identical to that shown in FIG. 7, for purposes of exemplary illustration link 54 is shown as being of the type illustrated in FIG. 15 to be described hereinafter. The other end of link 54 is, by pintle means, connected to a pair of plate links 24a and 24b identical to those shown in FIGS. 2, 3 and 9. Another pintle 22 connects the plate links to a second link 54, again connected by a pintle 22 to another strap link 21. The last mentioned strap link 21 engages the adjacent one of two connectors 53. The connectors 53 are mounted on pintles 55 and 56, respectively. The pintles 55 and 56 are identical to pintles 51 and 52 and connect pushers 57a and 57b forming a pusher assembly generally indicated at 57. Again it will be understood that pusher assembly 57 is identical to pusher assembly 50.

The distance between pusher assemblies 50 and 57 may be adjusted in the same manner described with respect to the chain of FIGS. 2 and 3. Thus, the distance between these pusher assemblies may be increased by the addition of one or more plate link assemblies similar to plate links 24a and 24b and one or more links 54.

The link 54, as illustrated in FIG. 15, may have the same general proportions as the conventional link of FIG. 7. The link 54 may or may not be formed with longitudinal depression such as that shown at 31 in FIG. 7. The link of FIG. 15 differs from that of FIG. 7 primarily in that it has a single transverse perforation 58 rather than a pair of perforations such as those indicated at 32 and 33 in FIG. 7. This single perforation, elongated in the direction of the long axis of the link, serves the same purpose but renders the link easier and less expensive to manufacture.

All of the connectors 53 are identical. A side elevational view of connector 53 is shown in FIg. 14. The connector comprises an elongated member terminating in rounded ends. The center peripheral portion of the connector may be slightly depressed as indicated at 59 for the same reasons given with respect to the depressed portion 31 in FIG. 7, if required.

At one end, the connector is provided with a transverse perforation 60 to receive the pintle 55 of pusher element 57. As viewed in FIG. 14, the perforation 60 has a vertical dimension such as to just nicely receive pintle 55. The perforation 60 has a horizontal dimension, however, that is greater than the diameter of pintle 55. The corners of perforation 60 nearest the adjacent end of the connector may be relieved as at 61 to alleviate pressures at these corners during flexing of the pusher element 57.

The connector 53 has a second transverse perforation 62. The perforation 62 is substantially identical to the perforation 20d described with respect to FIG. 8. Under normal conditions, the perforation 62 is adapted to receive the base portion 25 of strap link 21. Thus, as viewed in FIG. 14, the perforation 62 has a vertical dimension such as to just nicely receive the strap link base portion 25. The perforation 62 has a horizontal dimension, however, longer than the diameter of the rounded ends 26c or 28c of strap link 21 (see FIGS. 4 and 5). Again, the corners of perforation 62 nearest the end of connector 53 may be relieved. One such relief is shown at 64. The relief 64 is equivalent to and for the same purpose as relief 20f of FIG. 8. The reliefs 61 at the forward end of connector 53 and the reliefs 64 at the rearward end of the connector are preferred, but their presence is not required.

One or both sides of connector 53 may be provided with a shallow arcuate depression at the position of perforation 62. One such depression is shown at 63 in FIG. 14. The arcuate depression has a radius at least slightly larger than that of the circular leg portions 26c or 28c of strap link 21. This depression 63 lessens the required amount by which portion 26c or portion 28c must be inserted through perforation 62 before the strap link may be rotated to its final position with strap link base 25 in perforation 62.

In FIG. 13 pusher elements 50 and 57, strap links 21 and plate links 24a-24b are shown having identical pitches E. Similarly, connectors 53 and links 54 are shown having identical pitches F. Thus the chain pitch equals E plus F.

FIGS. 16 shows the assembly of pusher assembly 50, connector 53 and strap link 21. Pusher 50a has at its end facing pusher 50b a pair of surfaces 66 and 67 forming a shallow V-shaped notch. The surfaces 66 and 67 meet at the longitudinal axis of pusher 50a. The surfaces 66 and 67 terminate in flats forming surfaces 68 and 69 respectively. Finally, reliefs are provided forming surfaces 70 and 71.

Pusher 50b has a pair of surfaces 72 and 73 forming a shallow V-shaped notch and equivalent to surfaces 66 and 67, respectively. The pusher 50b also has flats or surfaces 74 and 75 equivalent to surfaces 68 and 69 on pusher 50a. Finally, reliefs are provided on pusher 50b forming surfaces 76 and 77 equivalent to surfaces 70 and 71 on pusher 50a. The pushers 50a and 50b and the various surfaces thereon are more fully described in the above mentioned United States Letters Pat. No. 3,155,225.

As taught in that patent, the connector 53 is attached to pusher elements 50a and 50b by virtue of the passage of pintle 52 through the perforation 60 of connector 53. Since perforation 60 is of elongated cross section, the connector and the entire pusher element 50 may assume various angular relationships between a position wherein the sides of the connector are in abutment with surfaces 71 of pusher 50a and 73 of pusher 50b and a position wherein the sides of the connector 53 are in abutment with surfaces 67 of pusher 50a and 77 of pusher 50b. It will be understood that an additional connector element 53 mounted on pintle 51 may assume similar angular relationships with pushers 50a and 50b. This being the fact, sufficient horizontal articulation between these elements is provided to enable the pusher chain to properly track in the conveyor base sections.

Nevertheless, as indicated above, this articulation is limited to about 80° to the conveying direction by the above described abutment of the sides of connector 53 with surfaces 71 of pusher 50a and 73 of pusher 50b or surfaces 67 of pusher 50a and 77 of pusher 50b. The range of angular relationships between the pusher element assembly 50 and connector 53 is not sufficient to enable one or the other of pusher elements 50a and 50b to dodge an obstruction such as that shown at 36 in FIG. 9.

It will be understood that an additional strap link 21 will be engaged in the transverse perforation of connector 53 (see FIG. 13) on pintle 51 of the pusher assembly 50. The strap links 21 will cooperate with the connectors 53 in the same manner described with respect to the embodiment of FIG. 9. In this instance, connectors 53 serve much the same purpose as extensions 20b and 20c, respectively (see FIG. 9), except that the connectors 53 will lend additional horizontal flexibility to the structure. As in the case of the embodiment of FIG. 9, the pusher assembly 50 will be enabled to assume a position wherein its long axis is at a lesser angle to the conveying direction B than hitherto possible in the absencr of universal joints, links made of flexible material or the like. In the particular embodiment illustrated, strap links 21 alone would enable the pusher assembly 50 to achieve a position wherein its long axis would lie at an angle of about 44° to the conveying direction B. When combined with pusher assembly 50 and connecting links 53 this angle may be reduced to about 35°. Again, this flexing in the horizontal plane is accomplished with a minimum of shortening of the pusher chain. It will be understood by one skilled in the art that the same degree of articulation could be achieved if links of the type shown in FIG. 15 were substituted for connector links 53. It will further be understood that the ultimate degree of articulation achievable by the chain may be varied according to the design of the chain elements with the above listed factors in mind together with the required or desired pitch of the chain.

FIG. 16 is also intended to clearly show what can be done in an instance wherein a consideration of all of the above noted factors together with the desired pitch of the chain dictate that the width of connector links 53 be greater than the distance between the inside surface of strap link portion 25 and strap link portions 26c or 28c. As indicated above, connector link 53 may be provided with an arcuate depression 63 at the position of its transverse perforation 62. Both sides of the connector link may be provided with such a depression if desired. The depression 63 is so sized as to have a radius equal to or slightly larger than the radius of portions 26c and 28c of strap link 21. Depression 63 is further so configured that the distance between its deepest portion and the opposite side of connector link 53 is equal to or slightly shorter than the distance between the inside surface of strap link portion 25 and strap link portions 26c or 28c. Under these circumstances, either of legs 26 or 28 may be inserted through perforation 62 in the connector link and the strap link may be rotated and shifted to its final position as shown in FIG. 16.

FIG. 17 is similar to FIG. 16 but illustrates a slightly modified version of the chain. In FIG. 17 the chain is made up of a pusher assembly generally indicated at 78. In this instance, the pusher assembly comprises two pusher elements 78a and 78b permanently connected together by pintle means 79 and 80. The pusher assembly 78 differs from the pusher assembly 50 of FIG. 16 primarily in that the facing surfaces 81 and 82 of pusher elements 78a and 78b are rectilinear and parallel.

In the embodiment of FIG. 17, the connector links are indicated as being of the type shown in FIG. 15 and like parts have been given like index numerals. The connector links 54 are engaged bby strap links of the type illustrated in FIG. 12. Again, like parts have been given like index numerals. Strap link 42 on the left hand side of the Figure is illustrated in a position it would assume during assembly of the chain. It will be noted that the distance between the inside surface of the portion 45 of the strap link and the enlarged portion 46 thereof is longer than the width of the adjacent connector 54, thereby allowing the strap link to be inserted through the perforation 58 of the connector link and rotated into its final position. The strap link 42 on the right hand end of FIG. 17 is illustrated as being connected by a pintle 42a to another link which may be identical to connector links 54 and is therefore given the same index numeral. The strap link at the left hand side of FIG. 17 will be similarly connected to another link. The distance between pusher elements may be varied as described with respect to FIG. 13.

Referring again to that strap link 42 on the right hand side of FIG. 17, it will be noted that the width of all of the links 54 are the same. Similarly, the distance between the strap link legs 43 and 44 is only slightly longer than the width of links 54. Finally, the distance between the inside surface of strap link portion 45 and the enlarged portions 46 and 47 is substantially equal to the width of links 54.

It will be noted from FIG. 17 that the strap links may turn in their respective connector link 54. In so doing, one or the other of legs 43 or 44 will enter into the opening 58 in the adjacent connector link while the strap link portion 45 will partially extend outside of the perforation 58. In the embodiment shown, the articulation would be such that the pusher assembly 78 could lie at an angle of about 44° to the conveying direction. An even lesser angularity to the conveying direction could be achieved if the connector links 54 were provided with rounded edges as indicated in dotted lines at 54a.

FIGS. 18 through 24 illustrate an exemplary pusher element which may be readily and inexpensively fabricated and which may be substituted for those shown in the embodiment of FIGS. 2 and 3. As is clear from FIG. 24, the pusher element is made up of first and second body parts, generally indicated at 83 and 84, respectively.

Body part 83 is clearly illustrated in FIGS. 18 through 20. Body part 83 comprises a flat base 83a extending the length of the part and terminating at its ends in upturned knob-like structures 85 and 86. A web 87 extends from knob 85 axially of the base. The web 87 is an integral part of the knob and base. The web 87 terminates in a vertical wall 88 short of the center of the first body part. Adjacent the vertical end 88 there is a notch 89.

In similar fashion, the other end of the first body part is provided with an integral web 90 extending axially and constituting an integral portion of the base 83a and knob-like end 86. The web 90 terminates in a vertical wall 91 and is provided with a notch 92 similar to the notch 89. It will be noted that the vertical end walls 88 and 91 of webs 87 and 90 are in opposed, spaced relationship. The webs 87 and 90 constitute the primary material advancing means or pusher surfaces of the pusher element. The base portion of the first body part has a pair of diametrically opposed notches 93 and 94 located centrally thereof. Notches 93 and 94 are most clearly seen in FIG. 18. Finally, an additional transverse notch 95 is provided centrally of the underside of base portion 83a.

The second body part 84 is clearly shown in FIGS. 21 through 23. This body part comprises a C-shaped portion 96 provided with laterally extending flanges 97 and 98. As will be shown hereinafter, the flanges 97 and 98 are adapted to fit in notches 89 and 92, respectively, in the first body part 83.

The free ends of the C-shaped portion 96 are spaced by a distance equal to the distance between notches 93 and 94 in the first body part 83. These free ends are also of the same width as notches 93 and 94 and are adapted to be received therebetween. The C-shaped body part has central, peripheral depressions 99 and 100 adapted to constitute a continuation of notch 95 on the under side of body part 83. Finally, as is most clearly shown in FIGS. 21 and 23, the endmost corners of the inside surface of the C-shaped member are relieved as at 101 and 102.

The assembly of the first body part 83 and the second body part 84 is illustrated in FIG. 24. The second body part 84 is placed on the first body part so that its flanges 97 and 98 are received in the first body part notches 89 and 92, respectively. At the same time, the free ends of the C-shaped portion 96 are received in notches 93 and 94 of the first body part.

The second body part flanges 97 and 98 are welded in place in the first body part notches 89 and 92. In similar fashion, the free ends of the C-shaped body portion 96 are welded in place in notches 93 and 94 of the first body part. The depressed peripheral portions 99 and 100 of the C-shaped element 96 blend with notch 95 on the underside of the first body part to form a continuous depressed surface equivalent to that shown at 31 in FIG. 7 and serving the same purpose, i.e., the depressions 99 and 100 in the second body part and the notch 95 in the first body part will assist the pusher element in traveling over sprocket means. These depressions may be eliminated when not needed.

It will be evident that the inside arcuate surfaces of the C-shaped portion 96 will serve the same purpose as the perforations 20d and 20e in pusher element 20 of FIGS. 2 and 3. The reliefs 101 and 102 at the corners of these inside surfaces are equivalent to and serve the same purposes as relief 20f of FIG. 8. In use, the pusher element of FIGS. 18 through 24 will function in the same manner described with respect to pusher element 20 of FIG. 9. The inside arcuate surfaces of the C-shaped portion 96 are adapted to receive strap links 21 (not shown) in the same manner described with respect to FIGS. 2 and 3. The strap links are engaged with C-shaped portions 96 prior to attachment of body part 84 to body part 83 of the pusher element.

FIGS. 25 through 29 illustrate another embodiment of a pusher element. This embodiment is similar to that of FIGS. 18 through 24, differing primarily in that the C-shaped body portion equivalent to that indicated at 96 in FIGS. 21 through 23 is an integral part of the first body portion equivalent to first body portion of FIGS. 18 through 20.

Turning to FIGS. 25 through 27, the first body portion 103 is shown as having a base 104 terminating in end knobs 105 and 106 and having longitudinally extending flanges 107 and 108 notched as at 109 and 110 and terminating as at 111 and 112. Centrally of the base portion are a pair of opposed arcuate members 113 and 114 such that in cross section, the center of the body part 103 has a C-shaped cross section, as will be evident from FIG. 27. Taken together, the arcuate elements 113 and 114 are equivalent to the C-shaped portion 96 of FIGS. 21 through 23. The members 113 and 114 each have a peripheral central depression 115 and 116 respectively which is continuous through the bottom surface of the first body part 103 by virtue of notch portion 117 (see FIG. 26). Depressions 115 and 116 and notch 117 may be eliminated where not necessary. The inside arcuate surfaces of elements 113 and 114 are relieved at the corners, as shown at 118 and 119.

The second body portion of the embodiment of FIGS. 25 through 29 is shown in FIG. 28. This body portion is indicated generally by index numeral 120. It comprises a plate-like structure having two enlarged portions 121 and 122 joined by a web 123. The enlarged portions 121 and 122 are configured like flanges 97 and 98 in FIG. 21. The web 123 has a width equivalent to the distance between the free ends of arcuate members 113 and 114.

The assembly of the structure of FIGS. 25 through 27 and the structure of FIG. 28 is shown in FIG. 29 wherein like parts are given like index numerals. In this embodiment, it will be evident that the plate 120 is simply placed upon the first body part 103 in such a way that the enlarged portions 121 and 122 of the plate lie within the are welded to notches 109 and 110 in the first body part. The free ends of elements 113 and 114 of the first body part fit between enlarged portions 121 and 122 of plate 120 and abut the web 123 of the plate. If desired, the free ends of elements 113 and 114 may be welded to plate 120. Again strap links are engaged in elements 113 and 114 before attachment of body part 120 to body part 103.

Figure 31:
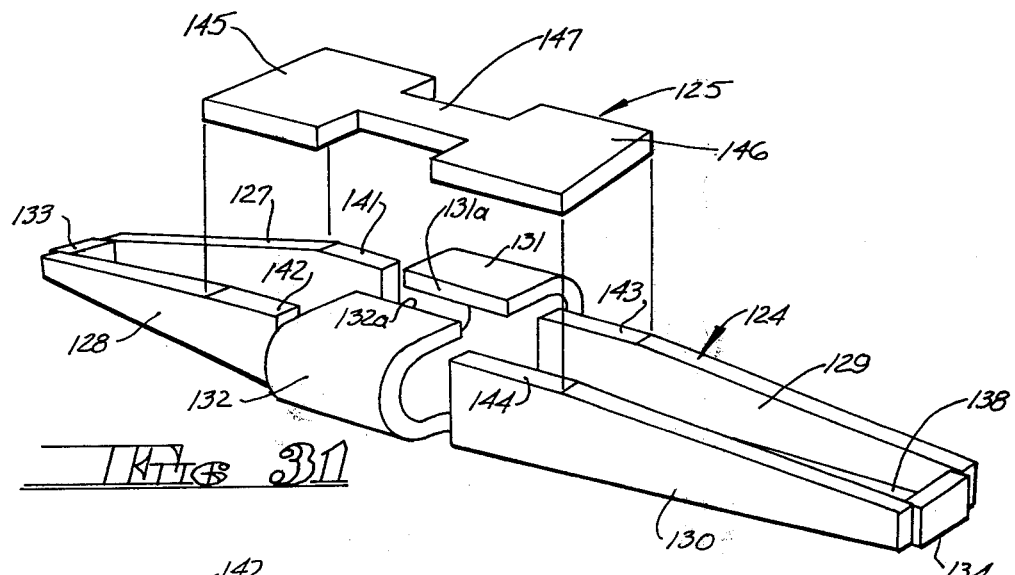
FIG. 31 is an exploded perspective view illustrating the part of FIG. 30 in formed condition together with a second part of the pusher element.
Figure 32:
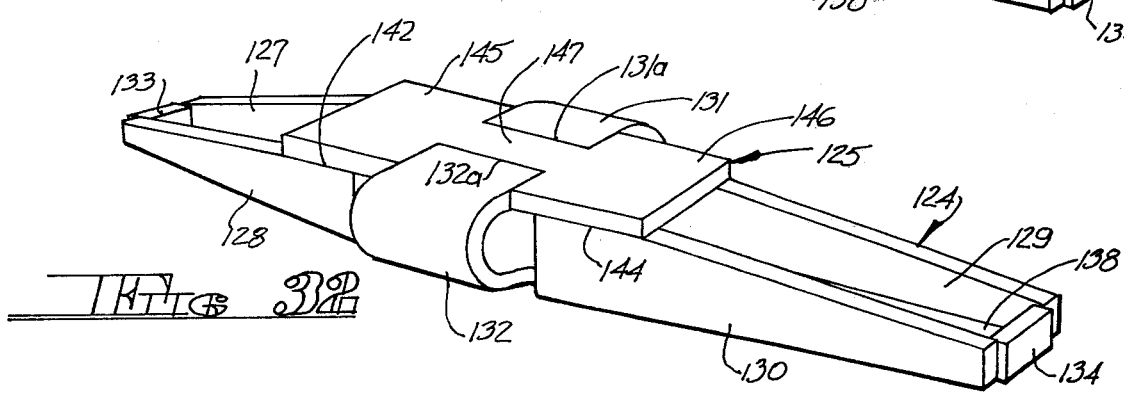
FIG. 32 is a perspective view illustrating the fully assembled pusher element of FIGS. 30 and 31.

FIGS. 30 through 32 illustrate a form of pusher element which may be economically fabricated from heavy gauge metallic sheet or plate by a series of cutting, bending and welding operations. As will be evident from the exploded view of FIG. 31, the pusher element is made up of a first part 124 and a second part 125. The first part 124 is illustrated in FIG. 30 in its as cut or punched form. As will be described hereinafter, the broken lines in FIG. 30 represent bend or fold lines. The part 124 comprises an elongated portion 126 having a first pair of opposed tabs 127 and 128, a second pair of opposed tabs 129 and 130 and a third pair of opposed tabs 131 and 132. Finally, end tabs are indicated at 133 and 134.

Referring to FIGS. 30 and 31, opposed tabs 27 and 28 are bent upwardly along fold lines 135 and 136 to form side walls of the left hand end of the pusher element as viewed in FIG. 31. To complete this left hand end of the pusher element, end tab 133 is bent upwardly along fold line 137. End tab 133 may be welded to the tabs 127 and 128, if desired.

In a similar fashion the right end of the pusher element (as viewed in FIG. 31) may be formed by folding tabs 129 and 130 upwardly along fold lines 138 and 139, respectively. This end of the pusher element is completed by folding end tab 134 upwardly along fold line 140 and welding it to tabs 129 and 130, if desired.

It will be clearly seen from FIG. 31 that the tabs 127 and 128 have their upper edges so configured as to slope upwardly from end tab 133 to a pair of flats 141 and 142, respectively. In similar fashion, the upper edges of tabs 129 and 130 slope upwardly from end tab 134 to a pair of flats 143 and 144, respectively. The flats 141 through 144 serve as mounting surfaces for the second pusher element part 125 as will be described.

The opposed central tabs 131 and 132 are bent upwardly and inwardly with their ends 131a and 132a in opposed and parallel spaced relationship. It will be immediately evident that the tabs 131 and 132 form a structure equivalent to portions 113 and 114 of the embodiment of FIGS. 25 through 29 or the portion 96 of the embodiment of FIGS. 18 through 24. These portions, it will be understood, will be those portions of the pusher element equivalent to the pusher element extensions 20b and 20c of the embodiment of FIGS. 2, 3 and 9 and will be engaged by strap links.

The second part 125 of the pusher element of FIGS. 30 through 32 is an H-shaped element having enlarged ends 145 and 146 joined by an intermediate narrow web 147. The web 147 is of a length substantially equal to the width of opposed tabs 131 and 132 of the first part 124. As will be evident from FIGS. 31 and 32, the second part 125 is adapted to be affixed by welding or the like to the part 124 so that its end 145 is supported on flats 141 and 142 and its end 146 is supported on flats 143 and 144. The ends 131a and 132a of tabs 131 and 132 of part 124 abut the web 147 of part 125 and fill up the space between ends 145 and 146 of part 125. The tabs 131 and 132 may be welded to the part 125 and the ends 145 and 146 of part 125 may be welded to their respective ones of flats 141 through 144 of part 124. In this way a completed pusher element, as illustrated in FIG. 32, may be inexpensively manufactured. Again, strap links (not shown) are engaged with tabs 131 and 132 prior to attachment of part 125 to 124.

FIGS. 33 and 34 illustrate another embodiment of pusher element which may be inexpensively formed from heavy gauge metallic sheet or plate. This embodiment comprises four basic parts generally indicated at 148 through 151. The part 148 constitutes an elongated member of similar shape to the portion 126 of part 124 of FIG. 30. The part 148 has optional end tabs 152 and 153 which are folded upwardly as shown. The part 148 also has opposed central tabs 154 and 155 which may be curved upwardly and inwardly until their ends 154a and 155a lie in opposed, parallel spaced relationship. The elements 154 and 155 are equivalent to tabs 131 and 132 of the embodiment of FIGS. 30 through 32.

Parts 149 and 150 constitute ribs. The base portions 149a and 150a of these ribs are adapted to be welded directly to the part 148 along the center line thereof as shown in FIG. 34. The ends 149b and 150b of these ribs are adapted to lie adjacent the inside surfaces of upturned ends 152 and 153, respectively, and may be welded thereto. The upper surfaces of ribs 149 and 150 slope upwardly to horizontal flat portions 149c and 150c which are equivlent to flats 141 through 144 of FIG. 31.

The part 151 comprises a pair of substantially triangular ends 156 and 157 joined by an intermediate web portion 158. The web 158 has a length equal to the width of portions 154 and 155 of part 148 and a width equal to the distance between ends 154a and 155a of the parts 154 and 155. The part 151 is affixed to the part 148 (see FIG. 34) with the ends 154a and 155a abutting web portion 158 and filling the spaces between ends 156 and 157. The ends 154a and 155a may be welded to the part 151. Similarly, the part 151 is welded to the flats 149c and 150c of ribs 149 and 150 to complete the pusher element.

FIG. 35 is a fragmentary view of a chain of the present invention. For purposes of an exemplary showing a pusher element of the type shown in FIGS. 33 and 34 is illustrated (like parts having been given like index numerals). It will be understood, however, that the pusher element of FIG. 35 could also be of the type shown in FIGS. 18 through 24 or 25 through 29 or 30 through 32.

In FIG. 35 the pusher element portions 154 and 155 are illustrated as being engaged by strap links 159 and 159a. The strap links are assembled to the pusher element before the second part 151 of the pusher element is affixed to the first pusher element part 148. As indicated above, in all of the embodiments of pusher elements illustrated in FIGS. 18 through 34 the strap links are engaged in the pusher element during its assembly. This eliminates limitations mentioned above that the strap link legs must be so configured and sized to pass through a perforation in a connector link or a pusher element extension.

Strap link 159 is pivotally attached to a link 160 by pintle means 161. In similar fashion, strap link 159a is pivotally affixed to an identical link member 160a by pintle means 161a. The links 160 and 160a may be of the type illustrated in FIG. 7 or, as shown, they may be of the type illustrated in FIG. 15.

It will be understood that the strap links 159 and 159a are identical and like parts of strap link 159a have been given like index numerals followed by "a". These strap links may be of any of the types taught in the present application. For purposes of an exemplary showing, they are illustrated as being similar to the strap link of FIG. 4. To this end, strap link 159 is generally U-shaped having a base portion 162 and legs 163 and 164. The leg 163 is made up of angularly related portions 165 and 166 terminating in an enlarged portion 167 having a perforation 168 therein to receive pintle 161. Leg 164 is similarly made up of angularly related portions 168 and 169 terminating in an enlarged portion 170 having a pintle receiving perforation 171 therethrough. The strap link 159a is similarly configured as illustrated. The pusher element portion 154 has a width substantially equal to the width of the adjacent link 160. The base portion 162 of the strap link has a length only slightly greater than the width of element 154. This size relationship is illustrated with respect to strap link 159a and pusher element portion 155.

The strap links of FIG. 35 differ from that of FIGS. 4 and 5 primarily in that the distance between the inside surface of base portion 162 and the enlarged ends 167 or 170 is less than the width of the link 160 or the pusher element portion 154. It may be assumed, for example, that the desired pitch of the chain dictated this design. Nevertheless, it will be noted that the portions 165 and 166 of leg 163 and the portions 168 and 169 of leg 164 are so angularly related that the long axis of the pusher element may lie at an angle of about 44° to the conveying direction. Strap link 159 is illustrated in its maximum angular relationship. It will also be noted that the parts of the chain are so sized that when strap link 159 is in its fully flexed position as illustrated, the forewardmost portion of the strap link still does not reach the center line 172 of the pusher element. Thus, strap links 159 and 159a can never interfere with each other. Such interference would curtail the amount of horizontal articulation capable of being achieved by the pusher element.

The chain of FIG. 35 utilizing any of the pusher elements illustrated in FIGS. 18 through 34 could be so designed as to have the capability of maximum horizontal articulation, as in the case of the chain illustrated in FIG. 10. This would simply involve the appropriate adjustment of the various factors listed abovee in conjunction with the pitch the chain is desired to have.

As explained with respect to FIGS. 2 and 13, the chains of the present invention have been described as having a pitch made up of two basic, repeated dimensions. It would be possible to have a chain pitch made up of two identical dimensions. Similarly, the chain pitch could be made up of more than two dissimilar dimensions. In the latter instance, however, the spacing of the teeth about the driving and idler sprockets would be uneven.

Modifications may be made in the invention without departing from the spirit of it. For example, the link 54 of FIG. 15 could be provided with a pair of depressions shown in dotted lines in FIG. 15 at 54a and 54b. The depressions 54a and 54b would be the full equivalent of depression 63 described with respect to FIGS. 14 and 16 and would serve the same purpose. The link 54 of FIG. 15 could be provided with depressions 54a and 54b on both sides (as in the case of link 54 of FIG. 14 so that the adjacent strap link could be inserted into link 54 from either side.

While all of the pusher elements of FIGS. 18 through 34 are described as having their components welded together, it will be understood that other forms of attachment could be used such as brazing, mechanical attachment and the like.

The embodiments of the invention in which an exclusive property or privilege is claimed are defined as follows:

1. A conveyor chain for a mining machine and the like for conveying material along a conveyor in a conveying direction, said conveyor being of the type providing an elongated base with upturned longitudinal edges, said chain comprising a plurality of elongated pusher assemblies adapted to be supported by and travel along said conveyor base, the long axis of each of said pusher assemblies normally lying perpendicular to said conveying direction, a plurality of chain element groups joining said pusher elements together, each of said chain element groups being made up of equal numbers of chain elements at least some of which are joined together by pintle means, the endmost link of each end of each chain element group comprising a strap link, each strap link comprising a generally U-shaped link having a base portion and a pair of legs terminating in enlarged free ends lying in parallel spaced relationship and being provided with coaxial pintle-receiving perforations to permit said strap link to be pivotally affixed to the adjacent link element of its respective link element group by one of said pintle means, each of said pusher assemblies having a pair of diametrically opposed extension means thereon intermediate the ends of said pusher assembly and extending laterally thereof, each of said extension means defining a transverse opening for the receipt of said base portion of the adjacent strap link of the adjacent one of said link element groups, said joinder of said link elements of said groups by said pintle means and said engagement of said strap link bases in said transverse openings defined by said pusher element extension means rendering said pusher chain capable of vertical articulation about the center line of each of said pintles and about the center line of each of said strap link bases, each of said transverse openings being elongated toward the axis of its respective pusher assembly rendering its respective strap link base horizontally shiftable therein whereby said conveyor chain is capable of horizontal articulation at the point of engagement of each strap link in its respective pusher assembly transverse opening and whereby each pusher assembly is capable of horizontal articulation to dodge an obstruction located on said conveyor base adjacent one of said upturned longitudinal edges.

2. The structure claimed in claim 1 wherein each of said pusher elements is capable of horizontal articulation to a position wherein said long axis of said pusher element lies at an angle of about 44° to the conveying direction.

3. The structure claimed in claim 1 wherein each of said pusher elements is capable of horizontal articulation to a position wherein said long axis of said pusher element is substantially parallel to the long axis of said link element pivotally joined to one of said strap links engaging said pusher element.

4. The structure claimed in claim 1 wherein each of said pusher elements is capable of horizontal articulation to a position wherein said long axis of said pusher element is substantially parallel to the long axis of each of said link elements pivotally joined to said strap links engaging said pusher element.

5. The structure claimed in claim 1 wherein the legs of each of said U-shaped strap links are rectilinear and in parallel spaced relationship throughout their length.

6. The structure claimed in claim 1 wherein said legs of each of said strap links have first portions adjacent said base portion angled outwardly and away from each other terminating in second portions angled inwardly and toward each other, said second portions terminating in said enlarged free ends in parallel spaced relationship and having said coaxial pintle-receiving perforations.

7. The structure claimed in claim 1 wherein said legs and base portion of each of said U-shaped strap links constitute a continuous arcuate structure terminating in said enlarged free ends in parallel spaced relationship and having said coaxial pintle-receiving perforations.

8. The structure claimed in claim 1 wherein said base portion of each of said U-shaped strap links is of a length at least equal to the width of said pusher assembly extension means with which it is to be engaged, said portions of said strap link legs extending between said base portion and said enlarged free leg ends each being of a length at least equal to said width of said pusher assembly extension means.

9. The structure claimed in claim 1 wherein said base portion of each of said U-shaped strap links is of a length at least equal to the width of said pusher assembly extension means with which it is engaged, said portions of said strap link legs extending between said base portion and said enlarged free ends each being of a length less than said width of said pusher assembly extension means.

10. The structure claimed in claim 1 wherein each of said pusher assemblies comprises an elongated unitary onepiece body portion the long axis of which normally extends perpendicular to the conveying direction, said extension means comprising integral diametrically opposed extension intermediate said body portion ends and extending outwardly of said body portion perpendicular to said long axis of said body portion, said opening defined by each of said extensions comprising a transverse perforation through said extension.

11. The structure claimed in claim 1 wherein each of said pusher assemblies comprises a pair of substantially identical elongated pusher arms oriented so as to extend in opposite directions, the long axes of said pusher arms together constituting said long axis of said pusher assembly, said pusher arms terminating in base portions held in parallel spaced opposed relationship by pintle means affixed to said pusher arms and lying to either side of an parallel to said pusher assembly long axis, said extension means each comprising a connector link having a transverse perforation through which one of said pusher assembly pintle means freely passes.

12. The structure claimed in claim 1 wherein each of said pusher assemblies comprises first and second parts secured together.

13. The structure claimed in claim 1 wherein each of said pusher assemblies comprises at least two parts cut or punched from metallic plate and secured together.

14. The structure claimed in claim 8 wherein said extended dimension of each of said transverse openings in said pusher assembly extension means is of sufficient length to permit insertion therethrough of one of said enlarged free ends of a strap link leg after which said link may be rotated into final position with said base portion thereof extending through said opening.

15. The structure claimed in claim 9 wherein said extended dimension of each of said transverse openings in said pusher assembly extension means is of sufficient length to permit insertion therethrough of said enlarged free end of one of said strap link legs, at least one side of each of said pusher assembly extension means having a depression formed therein at the position of and centrally of said opening therethrough, the distance from the deepest part of said depression to the opposite side of extension means transversely thereof being equal to or less than said length of said strap link legs between said base portion and said enlarged free ends thereof whereby one of said strap link legs may be inserted through said opening from that end thereof opposite said depression after which said link may be rotated into final position with said strap link base portion extending through said opening.

16. The structure claimed in claim 10 wherein the inside edges of said extension defining that portion of said perforation therethrough most remote from said pusher assembly axis are relieved.

17. The structure claimed in claim 11 wherein each of said connector links comprises an elongaged body having a first transverse perforation at one end thereof comprising said perforation to freely receive one of said pusher assembly pintle means, a second transverse perforation at the other end of said body comprising said elongated opening to receive the adjacent one of said strap links.

18. The structure claimed in claim 11 wherein each of said connector links comprises an elongated body having a single transverse perforation therethrough, said single perforationg being elongated in the direction of the long axis of said body to extend the majority of the length of said body, said single transverse perforation comprising both said transverse perforation for said pusher assembly pintle means and said transverse opening to receive the adjacent one of said strap links.

19. The structure claimed in claim 12 wherein said first pusher element part comprises an elongated base the long axis of which constitutes said long axis of said pusher assembly, said base having substantially flat top and bottom surfaces, upstanding knob-like structures formed at the ends of said base on the upper surface thereof, a pair of upstanding ribs formed on the upper surface of said base, each of said ribs extending axially along said upper surface of said base from one of said knobs, said ribs terminating in each in opposed spaced relationship near the longitudinal center of said base, the upper edge of each of said ribs having a notch formed therein at said end thereof, opposed notches formed in the side edges of said base at the longitudinal center thereof, said second pusher assembly part comprising a flat plate-like structure end portions of which C-shaped and terminating in ends lying in opposed spaced relationship, said ends being so configured as to enter and be secured in said notches in said base, said plate-like structure having lateral extensions configured to be received in and secured to said notches in said ribs, said C-shaped end portions of said plate-like structure comprising said pusher assembly extension means defining said openings to receive said strap links.

20. The structure claimed in claim 12 wherein said first pusher assembly part comprises an elongated base the long axis of which constitutes said long axis of said pusher assembly, said base having substantially flat top and bottom surfaces, upstanding knob-like structures formed at the ends of said base on the upper surface thereof, a pair of upstanding ribs formed on the upper surface of said base, each of said ribs extending axially along said upper surface of said base from one of said knobs, said ribs terminating in ends in opposed spaced relationship near the longitudinal center of said base, the upper edge of each of said ribs having a notch formed therein at said end thereof, diametrically opposed lateral extensions on said base at said longitudinal center thereof, each of said extensions being configured so as to have a C-shape, the ends of said C-shaped extensions lying in opposed spaced relationship, said second pusher assembly part comprising an elongated plate-like structure having diametrically opposed notches formed therein at the longitudinal center thereof, the ends of said plate-like structure being adapted to be received in and secured to said rib notches of said first part, said notches of said second part being sized to just nicely receive and have secured therein said opposed ends of said C-shaped extensions of said first part, said C-shaped extensions comprising said pusher assembly extension means defining said openings to receive said strap links.

21. The structure claimed in claim 13 wherein said pusher assembly comprises first and second parts, said first part comprising an elongated base the long axis of which constitutes said long axis of said pusher assembly, said base having integral upturned portions at its ends, said base having four integral upturned sides each extending from an end of said base along a longitudinal edge of said base and terminating in ends at a position on said base short of the longitudinal center of said base, the upper edge of each of said upturned sides presenting a horizontal flat near said longitudinal center of said base, diametrically opposed integral lateral extensions on said base at the longitudinal center thereof each Configured so as to have a C-shape, the ends of said C-shaped exttensions lying in opposed spaced relationship, said second pusher assembly part comprising an elongated plate-like structure having diametrically opposed notches formed therein at the longitudinal center thereof, the ends of said plate-like structure being supported by and secured to said flats on said upturned sides of said first part, said notches in said second part being sized to just nicely receive and have secured therein said opposed ends of said C-shaped extensions of said first part, said C-shaped extensions comprising said pusher assembly extension means defining said openings to receive said strap links.

22. The structure claimed in claim 13 wherein said first pusher assembly part comprises an elongated base the long axis of which constitutes said long axis of said pushed assembly, diametrically opposed integral lateral extensions on said base at the longitudinal center thereof each configured so as to have a C-shape, the ends of said C-shaped extensions lying in opposed spaced relationship, second and third parts each comprising an upstanding rib secured to the upper surface of said base, each of said ribs extending axially of said base said ribs terminating in ends in opposed spaced relationship near said longitudinal center of said base, a fourth part comprising an elongated plate-like structure having diametrically opposed notches formed therein at the longitudinal center thereof, the ends of said plate-like structure lying on and being secured to the upper edges of said ribs, said ends of said C-shaped extensions of said first part entering said notches of said fourth part and being secured thereto, said C-shaped extensions comrpising said pusher assembly extension means defining said openings to receive saidd strap links.

23. The structure claimed in claim 17 wherein said first transverse perforation of said connector link is elongated longitudinally of said connector link body and said opposed base portions of said pusher arms are so configured as to permit limited horizontal articulation of said connector link with respect to said pusher assembly pintle means passing through said first transverse perforation.

24. The structure claimed in claim 17 wherein said link body is relieved at portions at least of the openings formed in its sides by said first and second transverse perforations.

25. The structure claimed in claim 17 wherein said body of said connector link is of a width greater than the length of those portions of the legs of the strap link engaged therewith between said base portion of said strap link and said enlarged free leg ends, said second transverse perforation of said connector link having an extended dimension of sufficient length to permit insertion therethrough of one of said enlarged free ends of said strap link, at least one side of said connector link body having a depression formed therein at the position of said second transverse perforation and centrally thereof, the distance from the deepest part of said depression to the opposite side of said link body transversely thereof being equal to or less than said length of said strap link legs between said base portion and said enlarged free ends thereof whereby one of said strap link legs may be inserted through said second transverse perforation of said connector link from that side thereof opposite said depression after which said strap link may be rotated into final position with said strap link base portion extending through said second perforation of said connector link.

26. The structure claimed in claim 18 wherein said base portions of said pusher arms are configured to permit limited horizontal articulation of said connector links with respect to their respective pusher assembly pintle means.

27. The structure claimed in claim 18 wherein said link body is relieved at portions at least of the openings formed in its sides by said transverse perforation.

28. The structure claimed in claim 18 wherein said body of said connector link is of a width greater than the length of those portions of the legs of the strap link engaged therewith between said base portion of said strap link and said enlarged free leg ends, said transverse perforation of said connector link having an extended dimension of sufficient length to permit insertion therethrough of one of said enlarged free ends of said strap link, at least one side of said connector link body having a depression formed therein, the distance from the deepest part of said depression to the opposite side of said link body transversely thereof being equal to or less than said length of said strap link legs between said base portion and said enlarged free ends thereof whereby one of said strap link legs may be inserted through said transverse perforation of said connector link from that side thereof opposite said depression after which said strap link may be rotated into final position with said strap link base portion extending through said second perforation of said connector link.

29. A pusher assembly for use in a conveyor chain of the type comprising a plurality of elongated pusher assemblies adapted to travel along a conveyor base with their long axes normally perpendicular to the conveying direction and groups of equal numbers of link elements, each link element group being located between adjacent ones of said pusher assemblies and the endmost links of each link element group comprising generally U-shaped strap links each having a base portion and legs the free ends of which are connected by pintle means to the adjacent link element of its respective link element group, said pusher assembly comprising an elongated member having a pair of diametrically opposed extension means thereon intermediate its ends and extending laterally thereof, each of said extension means defining a transverse opening so configured as to receive said base portion of one of said strap links and to permit shifting of said strap link base portion therein whereby said pusher assembly is capable of horizontal articulation with respect to said conveying direction in addition to vertical articulation.

30. The structure claimed in claim 29 wherein said pusher assembly comprises an elongated unitary one-piece body portion the long axis of which normally extends perpendicular to the conveying direction, said extension means comprising integral diametrically opposed extensions intermediate said body portion ends and extending outwardly of said body portion perpendicular to said long axis thereof, said opening defined by each of said extensions comprising a transverse perforation through said extension.

31. The structure claimed in claim 29 wherein said pusher assembly comprises a pair of substantially identical elongated pusher arms oriented so as to extend in opposite directions, the long axes of said pusher arms together constituting said long axis of said pusher assembly, said pusher arms terminating in base portions held in parallel spaced opposed relationship by pintle means affixed to said pusher arms and lying to either side of and parallel to said pusher assembly long axis, said extension means each comprising a connector link having a transverse perforation through which one of said pusher assembly pintle means freely passes.

32. The structure claimed in claim 29 wherein said pusher assembly comprises first and second parts secured together.

33. The structure claimed in claim 29 wherein said pusher assembly comprises at least two parts cut or punched from metallic plate and secured together.

34. The structure claimed in claim 31 wherein each of said connector links comprises an elongated body having a first transverse perforation at one end thereof comprising said perforation to freely receive one of said pusher assembly pintle means, a second transverse perforation at the other end of said body comprising said elongated opening to receive the adjacent one of said strap links.

35. The structure claimed in claim 31 wherein each of said connector links comprises an elongated body having a single transverse perforation therethrough, said single perforation being elongated in the direction of the long axis of said body to extend the majority of the length of said body, said single transverse perforation comprising both said transverse perforation for said pusher assembly pintle means and said transverse opening to receive the adjacent one of said strap links.

36. The structure claimed in claim 32 wherein said first pusher element part comprises an elongated base the long axis of which constitutes said long axis of said pusher assembly, said base having substantially flat top and bottom surfaces, upstanding knob-like structures formed at the ends of said base on the upper surface thereof, a pair of upstanding ribs formed on the upper surface of said base, each of said ribs extending axially along said upper surface of said base from one of said knobs, said ribs terminating in ends in opposed spaced relationship near the longitudinal center of said base, the upper edge of each of said ribs having a notch formed therein at said end thereof, opposed notches formed in the side edges of said base at the longitudinal center thereof, said second pusher assembly part comprising a flat plate-like structure end portions of which are C-shaped and terminating in ends lying in opposed spaced relationship, said ends being so configured as to enter and be secured in said notches in said base, said plate-like structure having lateral extensions configured to be received in and secured to said notches in said ribs, said C-shaped end portions of said plate-like structure comprising said pusher assembly extension means defining said openings to receive said strap links.

37. The structure claimed in claim 32 wherein said first pusher assembly part comprises an elongated base the long axis of which constitutes said long axis of said pusher assembly, said base having substantially flat top and bottom surfaces, upstanding knob-like structures formed at the ends of said base on the upper surface thereof, a pair of upstanding ribs formed on the upper surface of said base, each of said ribs extending axially along said upper surface of said base from one of said knobs, said ribs terminating in ends in opposed spaced relationship near the longitudinal center of said base, the upper edge of each of said ribs having a notch formed therein at said end thereof, diametrically opposed lateral extensions on said base at said longitudinal center thereof, each of said extensions being configured so as to have a C-shape, the ends of said C-shaped extensions lying in opposed spaced relationship, said second pusher assembly part comprising an elongated plate-like structure having diametrically opposed notches formed therein at the longitudinal center thereof, the ends of said plate-like structure being adapted to be received in and secured to said rib notches of said first part, said notches of said second part being sized as to just nicely receive and have secured therein said opposed ends of said C-shaped extensions of said first part, said C-shaped extensions comprising said pusher assembly extension means defining said openings to receive said strap links.

38. The structure claimed in claim 33 wherein said pusher assembly comprises first and second parts, said first part comprising an elongated base the long axis of which constitutes said long axis of said pusher assembly, said base having integral upturned portions at its ends, said base having four integral upturned sides each extending from an end of said base along a longitudinal edge of said base and terminating in ends at a position on said base short of the longitudinal center thereof, the upper edge of each of said upturned sides presenting a horizontal flat near said longitudinal center of said base, diametrically opposed integral lateral extensions on said base at the longitudinal center thereof each so as to have a C-shape, the ends of said C-shaped extensions lying in opposed spaced relationship, said second pusher assembly part comprising an elongated plate-like structure having diametrically opposed notches formed therein at the longitudinal center thereof, the ends of said plate-like structure being supported by and secured to said flats on said upturned sides of said first part, said notches in said second part being sized to just nicely receive and have secured therein said opposed ends of said C-shaped extensions of said first part, said C-shaped extensions comprising said pusher assembly extensions means defining said openings to receive said strap links.

39. The structure claimed in claim 33 wherein said first pusher assembly part comprises an elongated base the long axis of which constitutes said long axis of said pusher assembly, diametrically opposed integral lateral extensions on said base at the longitudinal center thereof each being configured so as to have a C-shape, the ends of said C-shaped extensions lying in opposed spaced relationship, second and thrid parts each comprising an upstanding rib secured to the upper surface of said base, each of said ribs extending axially of said base, said ribs terminating in ends in opposed spaced relationship near said longitudinal center of said base, a fourth part comprising an elongated plate-like structure having diametrically opposed notches formed therein at the longitudinal center thereof, the ends of said plate-like structure lying on the upper edges of said ribs and being secured thereto, said ends of said C-shaped extensions of said first part entering said notches of said fourth part and being secured thereto, said C-shaped extensions comprising said pusher assembly extension means defining said openings to receive said strap links.

40. The structure claimed in claim 29 including a strap link permanently and captively held in each of said transverse openings defined by said diametrically opposed pair of extension means.

41. The structure claimed in claim 35 wherein said body of said connector link is of a width greater than the length of the portions of the legs of the strap link to be engaged therewith between said base portion of said strap link and said free leg ends, said transverse perforation of said connector link having an extended dimension of sufficient length to permit insertion therethrough of one of said free ends of said strap link, at least one side of said connector link body having a depression formed therein, the distance from the deepest part of said depression to the opposite side of said link body transversely thereof being equal to or less than said length of said strap link legs between said base portion and said free ends thereof whereby one of said strap link legs may be inserted through said transverse perforation of said connector link from that side thereof opposite said depression after which said strap link may be rotated into final position with said strap link base portion extending through said second perforation of said connector link.

* * * * *